United States Patent
Nastacio et al.

(10) Patent No.: US 7,895,470 B2
(45) Date of Patent: Feb. 22, 2011

(54) COLLECTING AND REPRESENTING KNOWLEDGE

(75) Inventors: Denilson Nastacio, Apex, NC (US); Michael L. Wamboldt, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/774,996

(22) Filed: Jul. 9, 2007

(65) Prior Publication Data

US 2009/0019310 A1 Jan. 15, 2009

(51) Int. Cl.
*G06F 11/00* (2006.01)

(52) U.S. Cl. .......................... 714/25; 714/26

(58) Field of Classification Search ........................ None
See application file for complete search history.

(56) References Cited

U.S. PATENT DOCUMENTS

| | | | | |
|---|---|---|---|---|
| 5,666,481 A | * | 9/1997 | Lewis | 714/4 |
| 5,717,835 A | * | 2/1998 | Hellerstein | 706/46 |
| 5,922,079 A | * | 7/1999 | Booth et al. | 714/26 |
| 6,012,152 A | * | 1/2000 | Douik et al. | 714/26 |
| 6,988,011 B2 | * | 1/2006 | Varma et al. | 700/79 |
| 7,165,194 B2 | | 1/2007 | Paradkar | |
| 7,318,177 B2 | * | 1/2008 | Ogle et al. | 714/47 |
| 7,500,142 B1 | * | 3/2009 | Cowart et al. | 714/25 |
| 2003/0115056 A1 | | 6/2003 | Gusler et al. | |
| 2004/0059966 A1 | * | 3/2004 | Chan et al. | 714/48 |
| 2004/0153764 A1 | | 8/2004 | Paradkar | |

OTHER PUBLICATIONS

E. Willighagen, Analyzing your internet application's log files II—configuring your reports, http://www.linuxfocus.org/English/November 2001/article218.shtml, pp. 1-7.

J.Punin, M. Krishnamoorthy and G. Uffelman, LOGML (Log Markup Language), http://www.cs.rpi.edu/~puninj/LOGML/, Aug. 24, 2001, pp. 1-3.

N.I. Galagan and T.P. Dovgyallo, Problem Description Language SITPLAN-2; Cybernetics and Systems Analysis, vol. 26, No. 1, Jan. 1990, pp. 1-2, http://www.springerlink.com, New York.

* cited by examiner

*Primary Examiner*—Michael C Maskulinski
(74) *Attorney, Agent, or Firm*—Stevens & Showalter LLP

(57) ABSTRACT

Problem determination knowledge is provided by an extraction tool that extracts tag information recorded in identified problem tracking tools, where the tags relate to problem knowledge. The extracted tag information is examined to produce a catalog of symptom definitions that can be utilized by tools such as problem submission, logging and/or analysis tools.

21 Claims, 15 Drawing Sheets

| Tag | Value | Description |
|---|---|---|
| .symptom.log | log file name ! portion of log or trace entry | The presence of this in a trace or log file is part of the complete problem characterization. E.g. SSL 90876E<br><br>Multiple "symptom.log" tags may be required to fully characterize a problem.<br><br>If a single log/trace entry uses multiple lines, such as in Java stack traces, enclose the relevant fragments between brackets. E.g. {java.lang.IndexOutOfBoundsException, com.ibm.module.SignOn.processRequest} |
| .symptom.log.missing | log file name ! portion of log or trace entry | The absence of this entry in a log file is part of the problem characterization. E.g. a module that has not been installed or a method that is never called.<br><br>Multiple "symptom.log.missing" tags are allowed, the absence of "*any**" of the values characterizes the occurrence of the problem. |
| .symptom.name | free-formed text | Short name for the symptom. E.g "Sign On EJB failure". Defaults to defect Abstract field |
| | | Explanation about the symptom being described by the other tags, such as "Sign On application fails when the data source"security" does not match the RDBMS backend for EJB Sign On. |
| .symptom.explanation .symptom.description | free-formed text | Not required if the value for "symptom:recommendation" is "fixed", see "symptom.recommendation".<br><br>Usually added to the CMVC comments right before integrating the defect once the actual problem is well understood (see symptom.reset)<br><br>Brackets can be used to enclose multiple lines of text, e.g { text text text text text text text text} |

FIG. 14A

| Tag | Value | Description |
|---|---|---|
| .symptom.recommendation | free-formed text | Possible solution to the problem, e.g. "Modify the property 'databaseurl' in the data source 'security' to match the JDBC url for the EJB application"<br><br>The special value "fixed" (without the quotes) indicate that the problem was due to a code bug that was fixed with the defect Symptoms with this tag-value can be used during regression testing to ensure the bug has not been reintroduced<br><br>Usually added to the CMVC comments right before integrating the defect once the actual problem is well understood (see symptom. reset)<br><br>Brackets can be used to enclose multiple lines of text, e.g. { text text text text text text text text text} |
| .symptom.reset.log | none | Used during problem investigation to invalidate all previous "symptom.log" tags, usually to reflect a new understanding of the problem solutions after some tags have already been recorded as part of the investigation |
| .symptom.reset.recommendation | none | Used during problem investigation to invalidate all previous "symptom.recommendation" tags, usually to reflect new understanding of how of better ways of solving the problem. |
| .symptom.reset | none | Used during problem investigation to invalidate all previous tags, usually to reflect new understanding of the problem causes and solutions. |

FIG. 14B

COLLECTING AND REPRESENTING KNOWLEDGE

BACKGROUND OF THE INVENTION

The present invention relates to systems, computer-implemented methods and computer program products for collecting and representing knowledge for problem determination.

An iterative process is often required to guide a user through a problem determination experience. Typically, a subject matter especialist (SME) interacts with the user to gather data about the symptoms of a problem. Eventually, the subject matter especialist may collect enough symptom information to be able to determine the underlying root cause of the problem experienced by the user. Alternatively, the underlying problem may be outside the scope of knowledge available to the subject matter especialist. As such, the user may be handed over from one subject matter especialist to another until the root cause of the problem can be determined and a solution can be recommended to resolve the problems experienced by the user.

The iterative process typically required as part of the interaction between the user experiencing the problem and each subject matter especialist can be time consuming and frustrating to the user experiencing the problem. For example, the end user is likely working on other activities and may not be available for lengthy dedicated sessions with the subject matter especialist, which may be required for the subject matter especialist to diagnose the root cause of the problem.

BRIEF SUMMARY OF THE INVENTION

According to an aspect of the present invention, a method of providing problem determination knowledge comprises identifying at least one problem tracking tool that contains tags therein, where the tags relate to problem knowledge. The method further comprises extracting information from the tags in the identified problem tracking tool(s), examining the information extracted from the tags and transforming the information extracted from the tags into symptom data based upon the examination of the information. The method further comprises updating a catalog of symptom definitions based upon the symptom data, wherein each symptom definition comprises data that characterizes a symptom to a previously considered problem and making at least a portion of the catalog of symptom definitions available to a software tool for performing at least one of problem determination and problem analysis.

According to another aspect of the present invention, a computer program product to provide problem determination knowledge comprises a computer usable medium having computer usable program code embodied therewith. The computer usable program code comprises computer usable program code configured to identify at least one problem tracking tool that contains tags therein, where the tags relate to problem knowledge. The computer program product further comprises computer usable program code configured to extract information from the tags in the identified problem tracking tool(s), computer usable program code configured to examine the information extracted from the tags and computer usable program code configured to transform the information extracted from the tags into symptom data based upon the examination of the information. The computer program product further comprises computer usable program code configured to update a catalog of symptom definitions based upon the symptom data, wherein each symptom definition comprises data that characterizes a symptom to a previously considered problem and computer usable program code configured to make at least a portion of the catalog of symptom definitions available to a software tool for performing at least one of problem determination and problem analysis.

According to yet a further aspect of the present invention, a system to provide problem determination knowledge comprises an identifier component, an extraction component, an examination component, a transformation component, an update component and an output component. The identifier component is provided to identify at least one problem tracking tool that contains tags therein, where the tags relate to problem knowledge. The extraction component is provided to extract information from the tags provided in the identified problem tracking tools(s), the examination component is provided to examine the information extracted from the tags and the transformation component is provided to transform the information extracted from the tags into symptom data based upon the examination of the information. The update component is provided to update a catalog of symptom definitions based upon the symptom data, wherein each symptom definition comprises data that characterizes a symptom to a previously considered problem. The output component is provided to make at least a portion of the catalog of symptom definitions available to a software tool for performing at least one of problem determination and problem analysis.

BRIEF DESCRIPTION OF THE SEVERAL VIEWS OF THE DRAWINGS

FIG. 14A is a first half of a table illustrating an exemplary tagging system for identifying problem knowledge in problem tracking tools according to various aspects of the present invention;

FIG. 14B is a second half of a table illustrating an exemplary tagging system for identifying problem knowledge in problem tracking tools according to various aspects of the present invention.

DETAILED DESCRIPTION OF THE INVENTION

According to aspects of the present invention, the knowledge, decision trees and other decision logic utilized by subject matter especialists are captured through snippets of information recorded in problem tracking tools. Thus, knowledge is collected even where multiple subject matter especialists are required in problem determination efforts. For example, subject matter especialists may record problem knowledge in tags, which may be added as remarks to a discussion thread in a corresponding problem determination tool. The tags are subsequently examined by an extraction tool. Information collected from the tags as a result of the examination by the extraction tool is utilized to maintain a symptom catalog containing symptom definitions, wherein each symptom definition comprises data that characterizes a symptom to a problem.

The symptom definitions can be utilized to assist in problem determination. For example, the symptom definitions can be imported in to a problem submission tool such as a support assistant. Once a user attempts to submit a problem, the submission tool can use that knowledge to guide the user towards executing additional data capture steps that would otherwise have to be executed later once a subject matter especialist starts working on the problem. As another example, the symptom definitions can be imported into an analysis tool for problem analysis and support.

Various aspects of the present invention further capture knowledge without requiring the development and support organizations to program the knowledge in Ant scripts, Java snippets or other knowledge platforms requiring programming. This approach avoids problems such as requiring attempts to summarize the knowledge only after the problem has been identified. Moreover, various aspects of the present invention avoid the requirement of specialized programming skills, which may be outside the normal skill set of typical support engineers.

Figure 1:
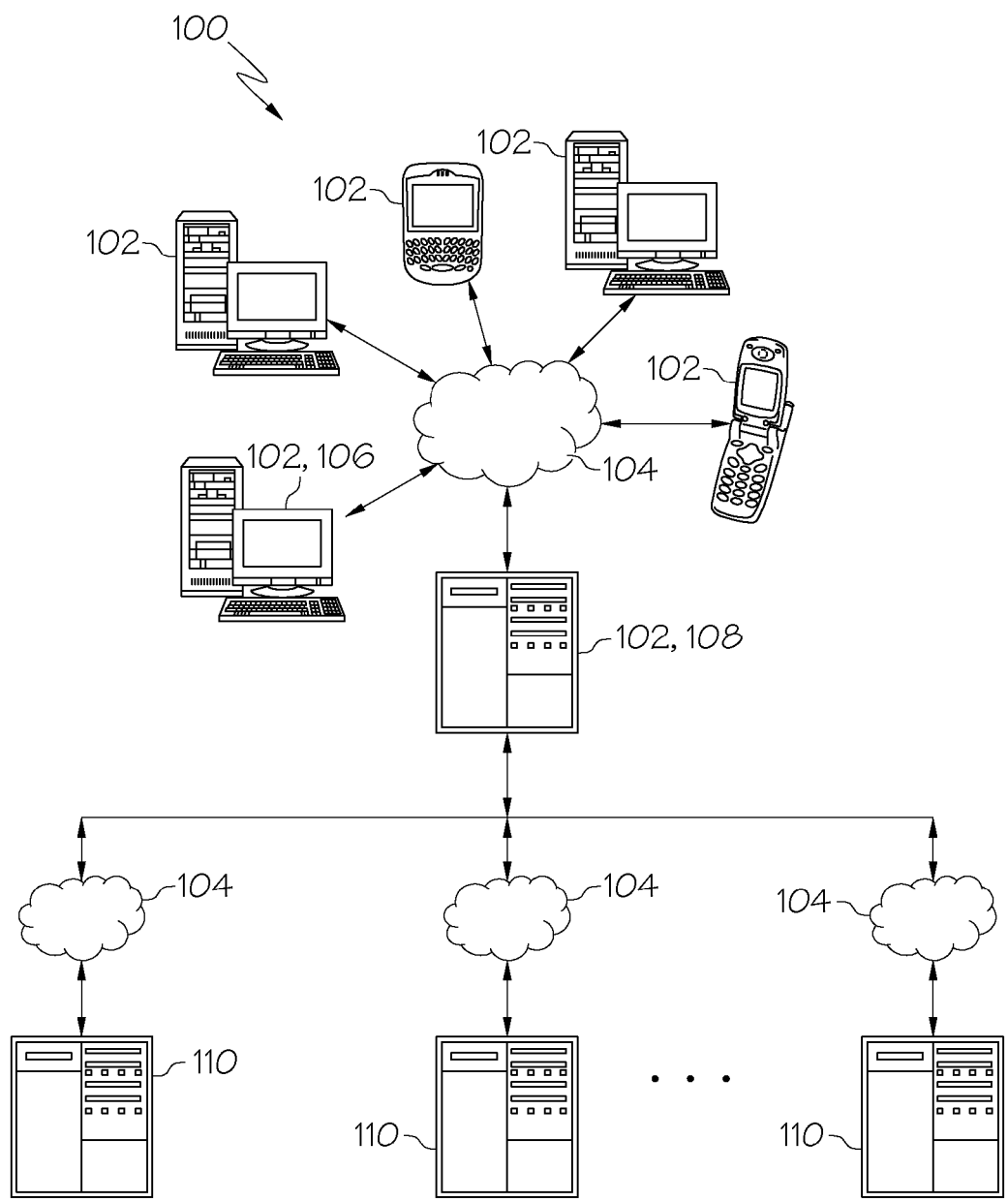
FIG. 1 is a schematic illustration of an exemplary system in which problem determination knowledge can be collected and represented according to aspects of the present invention.

Referring now to the drawings and particularly to FIG. 1, a general diagram of a computer system 100 is illustrated. The computer system 100 comprises a plurality hardware and/or software processing devices 102 that are linked together by a network 104. Typical processing devices 102 may include servers, personal computers, notebook computers, transactional systems, appliance or pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications and servers that interact with various databases, spreadsheets, structured documents, unstructured documents and/or other files containing information.

The network 104 provides communications links between the various processing devices 102, and may be supported by networking components that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the internet, including the world wide web, and/or other arrangements for enabling communication between the processing devices 102, in either real time or otherwise, e.g., via time shifting, batch processing, etc.

Although the exemplary system 100 is illustrated as a distributed computing system, it is also possible to practice various aspects of the present invention within a single processing device, such as an enterprise server computer. As such, the network 104 is shown by way of illustration, and not by way of limitation, as a computing environment in which various aspects of the present invention may be practiced.

Assume that a user on a first one of the processing devices 102, e.g., a personal computer also designated as 106, is attempting to purchase an item from a business entity that has an Internet-based store on the World Wide Web, which is hosted by the server 108. Further, assume that during the transaction, an error occurs. The business entity wants to resolve the root cause of the problem to avoid additional errors. As such, the business entity may rely on one or more subject matter especialists to help with problem determination. These subject matter especialists may be internal, e.g., part of an information technology department of the business entity. Alternatively, the business entity may not have the expertise to diagnose and correct the problem and may rely on third party subject matter especialists.

These subject matter especialists may communicate with the business entity via any suitable form of communication, including telephone, fax, e-mail, instant messaging, etc. Moreover, a subject matter especialist that is initially contacted may not have the domain knowledge required to solve the problem. As such, the business entity may be handed off from one subject matter especialist to another, until the root cause of the problem is resolved and a solution can be recommended to resolve the problems experienced by the business entity. This "handing off" during root cause problem determination may further require the involvement of subject matter especialists from multiple, independent third party service providers, e.g., such as a first service provider associated with the shopping cart utilized by the business entity, a second service provider associated with the server that the shopping cart is executed on, a third service provider that is associated with the network connection to the Internet, etc. As such, several processing devices 110 are schematically shown to illustrate that various subject matter especialists may be assisting a corresponding business entity from one or multiple potentially unrelated sources.

As each subject matter especialist hands over a problem to another subject matter especialist that is more skilled in the perceived problem area, the knowledge and implications with regard to the root cause problem that were generated by previous problem determination efforts that occurred before the handoff are often lost at the end of the problem resolution.

Figure 2:
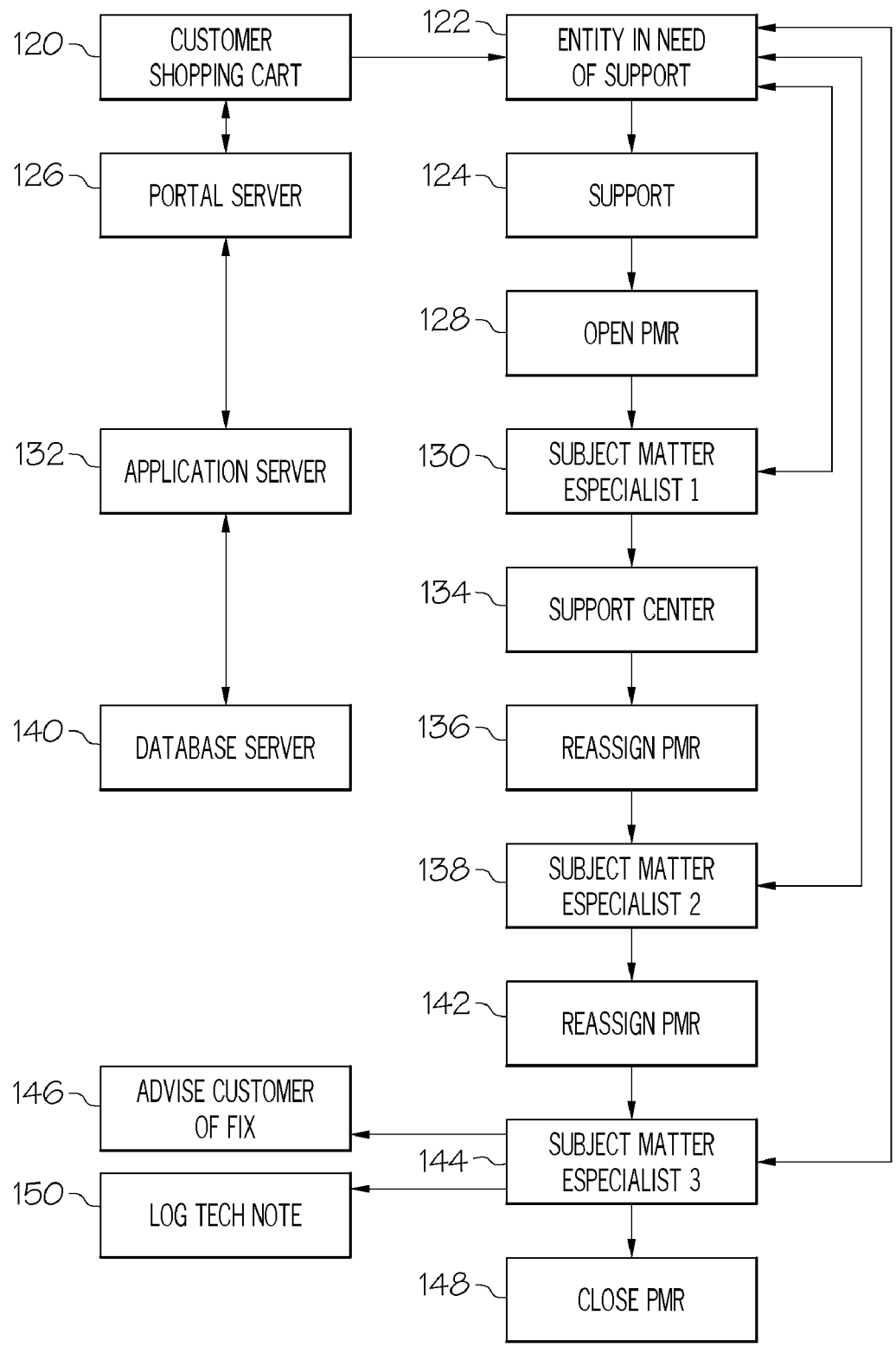
FIG. 2 is a flow diagram illustrating an exemplary interaction between a user and various problem determination specialists.

Referring to FIG. 2, as an example, assume that a business entity is experiencing a problem with an Internet based shopping cart 120 provided as part of a web application on a business server. Accordingly, the business entity reports a problem that they are experiencing at 122 to a support provider on a first date. An initial support diagnosis at 124 may track the problem, e.g., to a portal server 126. Accordingly, the support provider may open a problem management record (PMR) at 128 and assign the problem to a first subject matter especialist at 130, e.g., a portal server engineer. The portal server engineer may then perform diagnostic activities, which may require interaction with a user of the business entity to obtain necessary diagnostic information. Assume that the portal server engineer identifies entries in one or more error logs in the portal that indicate, for example, a time out in an enterprise Java Bean (EJB) container inside an Internet Web application server 132. Accordingly, the portal server engineer identifies that the problem falls back to the application server 132 and was not caused by the portal server 126. The portal server engineer may thus route the problem via the problem management record to a support center at 134 for problem determination. Once the problem management record has been routed, the portal server engineer moves on to a next assigned task.

A Support center then reassigns the problem management record at 136 to a second subject matter especialist, e.g., a Web application server specialist. The application server specialist performs diagnostic tasks at 138 such as tuning trace settings, which may require further interaction with a user of the business entity to obtain necessary diagnostic information in an attempt to recreate the problem. For example, the application server specialist may notice trace entry from the Java Database Connectivity (JDBC) driver indicating a database transaction timeout. Accordingly, the application server specialist identifies that the problem falls back to the database server 140 and was not caused by the application server 132. Thus, the problem management report is routed or reassigned at 142 to a third subject matter especialist, e.g., a database specialist.

The database specialist performs diagnostics at 144, such as turning on certain traces and performing other diagnostic activity, which may require yet further interaction with a user of the business entity to obtain necessary diagnostic information. In doing so, the database specialist may identify one or more trace entries that confirm the problem to be a well known problem already fixed in a database fixpack. The database specialist advises the entity requesting assistance to apply the fixpack at 146 and the problem management record is closed at 148. The database specialist may further write a technote at 150 with instructions about installing the database fixpack in case of performance problems, which may be confirmed by enabling the proper database trace settings.

Each of the above-described subject matter especialists may utilize a problem tracking tool that allows the especialist to utilize decision trees and organize domain knowledge. Exemplary problem tracking tools may comprise, for example, Configuration Management Version Control (CMVC) by International Business Machines (IBM) of Armonk, N.Y., USA, which performs software version control and software configuration management functions, Remote Technical Assistance Information Network (RE-TAIN) also by IBM, which includes a database system that supports problem management records, ClearQuest, also by IBM which is a work-flow automation tool from the Rational Software division of IBM, which performs the tracking of defects (bugs) in software development projects and Bugzilla by Netscape Communications of Mountain View, Calif., USA.

However, at best, the technote written at 150 contains information about the problem diagnosed by the database specialist. In a conventional system, the database specialist does not have knowledge with regard to either the entries in the logs detected by the portal server engineer 130 or the trace entry information from the web application server specialist 138. Moreover, each of the especialists may record problem determination knowledge in different problem tracking tools. Similarly, the portal server engineer 130 and the web application server specialist 138 will likely not have knowledge of the technote written by the database specialist 144. Accordingly, when a different customer reports the same problem on a second date after the first date, much of the knowledge with regard to the problem determination and root cause analysis is unavailable to the portal server engineer 130 and web application server specialist 138. This requires a large reproduction of effort and time.

Figure 3:
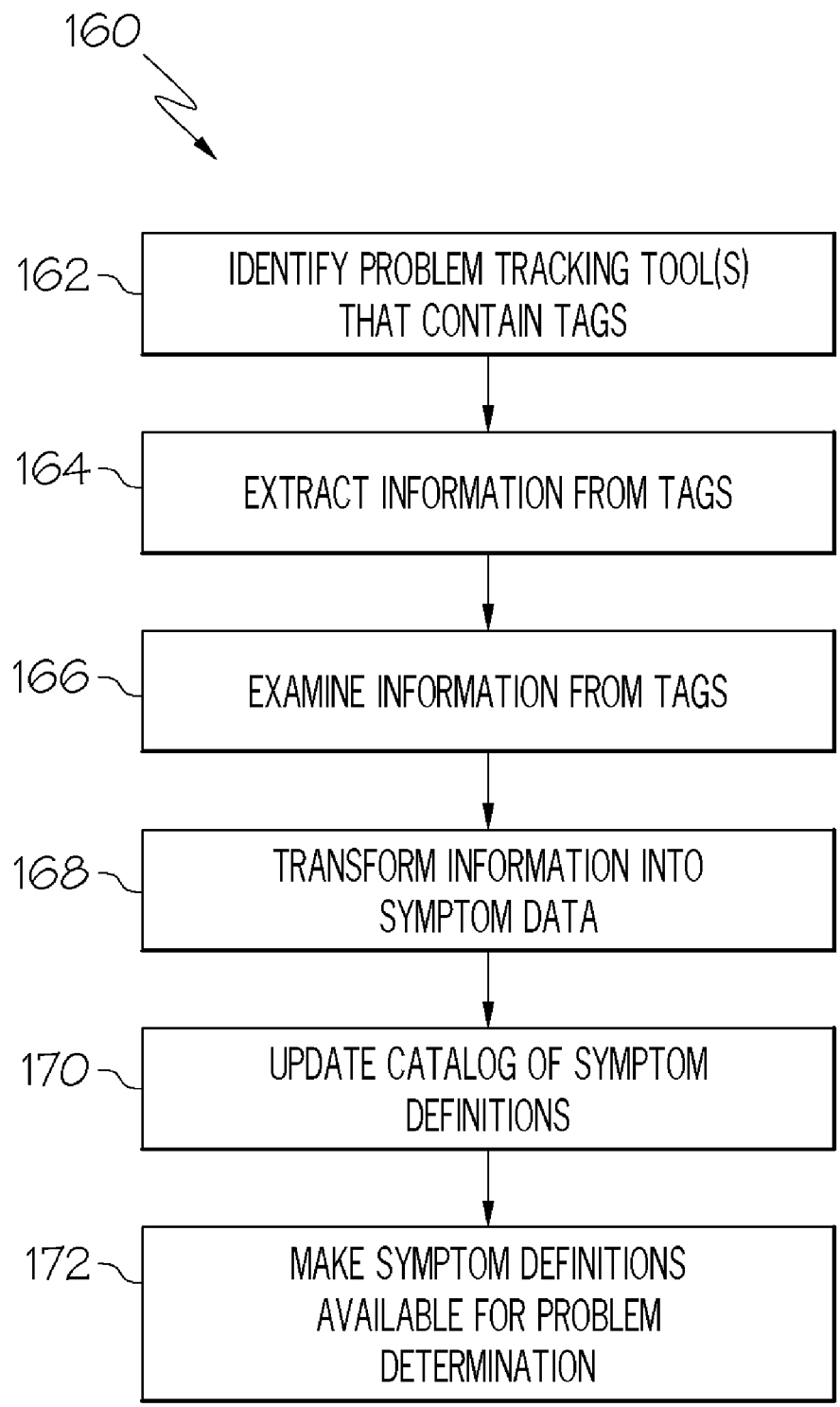
FIG. 3 is a flow chart illustrating a method of providing problem determination knowledge according to various aspects of the present invention.

Referring to FIG. 3, a method 160 provides problem determination knowledge according to various aspects of the present invention. The method 160 comprises identifying at least one problem tracking tool that contains tags at 162, where the tags relate to problem knowledge. For example, there may be a single problem tracking tool that contains problem determination knowledge in the form of tags. Alternatively, problem resolution knowledge may be distributed across multiple problem tracking tools. This step may also be a conceptual recognition of the problem tracking tool or tools that are available from which to gather problem resolution knowledge from corresponding tags.

According to an aspect of the present invention, knowledge is collected in the course of problem determination. For example, each domain expert that contributes to the resolution of a problem and/or contributes to a root cause determination may also contribute a tag that characterizes knowledge held by that domain expert. Tags may capture knowledge and decision trees utilized by a subject matter especialist through snippets of information recorded in a problem tracking tool such as CMVC, RETAIN, ClearQuest, Bugzilla, etc. Accordingly, tags may characterize a problem or other domain knowledge deemed relevant by the subject matter especialist. The tags may further indicate one or more recommendations for solving the problem. Examples of tags will be described in greater detail herein. According to various aspects of the present invention, the tags may be created as log entries, annotations, records, field entries, comments, threads, indications or other formats that are entered into the software used by the domain expert for problem determination.

The method 160 further comprises extracting information from the tags at 164. The manner in which problem knowledge is extracted from the problem tracking tool(s) will likely depend upon the manner in which problem knowledge is recorded. The method 160 further comprises examining the information extracted from the tags at 166, transforming the information extracted from the tags into symptom data based upon the examination of the information at 168 and updating a catalog of symptom definitions based upon the symptom data at 170, wherein each symptom definition comprises data that characterizes a symptom to a previously considered problem. In general, symptom definitions may correspond to events or collections of events and their associated root cause. Each symptom definition may also include other information, such as explanations, samples and solutions that identify an action or actions to be performed in order to resolve the underlying problem(s). As used herein, the term "symptom data" refers to data that may be used to create, modify, append, update, delete or otherwise manipulate one or more system definitions which are collected into a catalog.

The method 160 still further comprises making at least a portion of the catalog of symptom definitions available to a software tool at 172 for performing at least one of problem determination and problem analysis. For example, at least part of the information gathered into the symptom catalog may be imported or otherwise obtained by a problem submission tool, such as IBM Support Assistant, by IBM. Under this arrangement, once a user attempts to submit a problem, the submission tool can use that knowledge to guide the user towards executing additional data capture steps that would otherwise have to be executed later, e.g., once a subject matter especialist starts working on the problem.

The same knowledge can be reused in tools, which may include, for example, the Autonomic Computing (AC) Log and Trace Analyzer, by IBM. Under this arrangement, the information derived from the symptom catalog may be used to guide one or more subject matter especialists towards the resolution of a problem when the customer does not have access to a problem submission tool that is integrated with a knowledge base, including the symptom catalog. The reuse of domain knowledge further allows, for example, problem recommendations translated to multiple languages (reuse knowledge over different geographies).

As a few specific examples, the symptom catalog may be used in conjunction with the AC Log and Trace analyzer to inspect results, such as by using a command line interface for low footprint analysis, e.g., over telnet or local sessions. The symptom catalog may be used in conjunction with a Java Desktop edition of the AC Log and Trace analyzer for entry-level log analysis or the symptom catalog may be used in conjunction with the Eclipse edition of the AC Log and Trace analyzer for more complex log analysis and data correlation. The symptom catalog may also be used, such as by an AC Log and Trace Analyzer Sametime Bot for quick questions, e.g., where the user asks about symptom that relate to fragments of a log entry, etc. The above examples will be described in greater detail herein.

Figure 4:
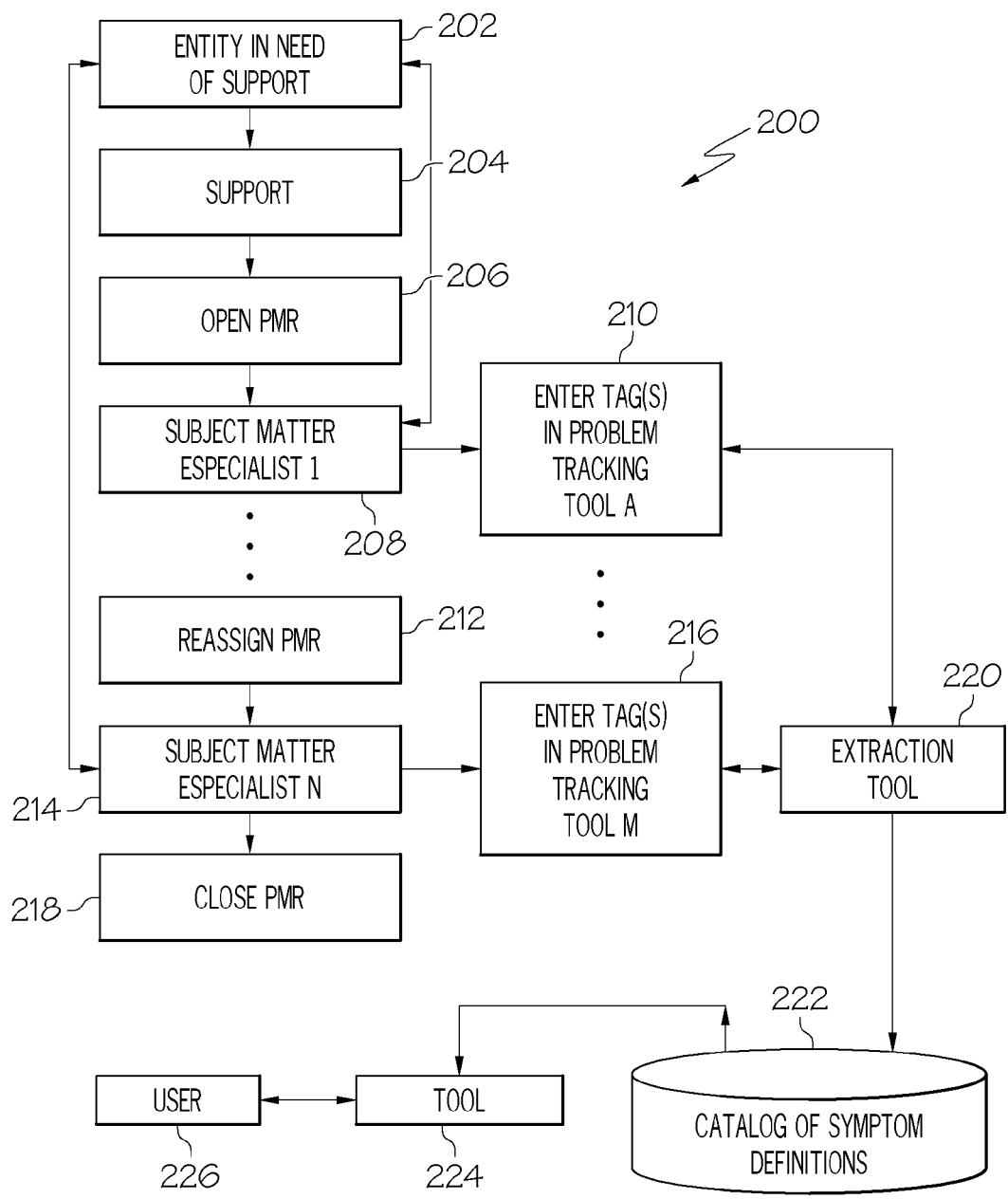
FIG. 4 is a flow diagram illustrating the collection of problem knowledge from tags generated by subject matter especialists according to various aspects of the present invention.

Referring to FIG. 4, a flowchart 200 illustrates an exemplary implementation of the method 160 shown in FIG. 3. An entity in need of support at 202 contacts a support provider at 204. Accordingly, the support provider may open a problem management record (PMR) at 206 and assign the problem to a first subject matter especialist at 208. During problem determination support, the first subject matter especialist may enter tags in a corresponding problem tracking tool at 210. For example, the first subject matter especialist may add annotations, notes, comments or provide other problem determination knowledge in logs, fields, threads or other suitable locations in the problem tracking tool for recording problem determination knowledge.

The first subject matter especialist may not have the domain knowledge required to solve or otherwise identify the root cause of the problem. Accordingly, the problem management record may be reassigned to another subject matter especialist at 212. The above process at 208, 210 and 212 may repeat through any number of subject matter especialists. For example, the Nth subject matter especialist, where N is any integer greater than zero, may resolve the root cause of the problem. Accordingly, the Nth subject matter especialist may enter one or more tags in their corresponding problem tracking tool and close the problem management record at 218. Also as illustrated, tags may be entered into M different problem tracking tools, where M is any integer greater than zero. In this regard it can be noted that N and M do not have to be equal, per se. For example, two or more subject matter especialists may provide tags in the same instance of a problem tracking tool.

Tag information entered in the various problem tracking tools is extracted at 220. The extracted the tag information is then examined and transformed into symptom data. The symptom data is utilized to update a catalog of symptom definitions 222. For example, and extraction tool may be utilized to extract, examine and transform information from the tags. The extraction tool may work off-line or otherwise to provide the symptom data that is utilized to update and maintain the catalog of symptom definitions. At least a portion of the information contained in the catalog of symptom definitions may be made available to analysis tools at 224 to assist the user in problem determination at 226.

There are a number of ways to implement the correlation of events with symptoms for root cause problem analysis. For example, if a particular root cause problem is being investigated, the symptoms definitions of that particular problem may be extracted from the corresponding symptoms catalog and the analysis may focus on events that are predicates of the associated symptoms. Alternatively, symptoms may be read out from the symptoms database upon the detection or selection of events that have occurred. Thus, the symptom catalog may be accessed at as part of an iterative analysis.

Figure 5:
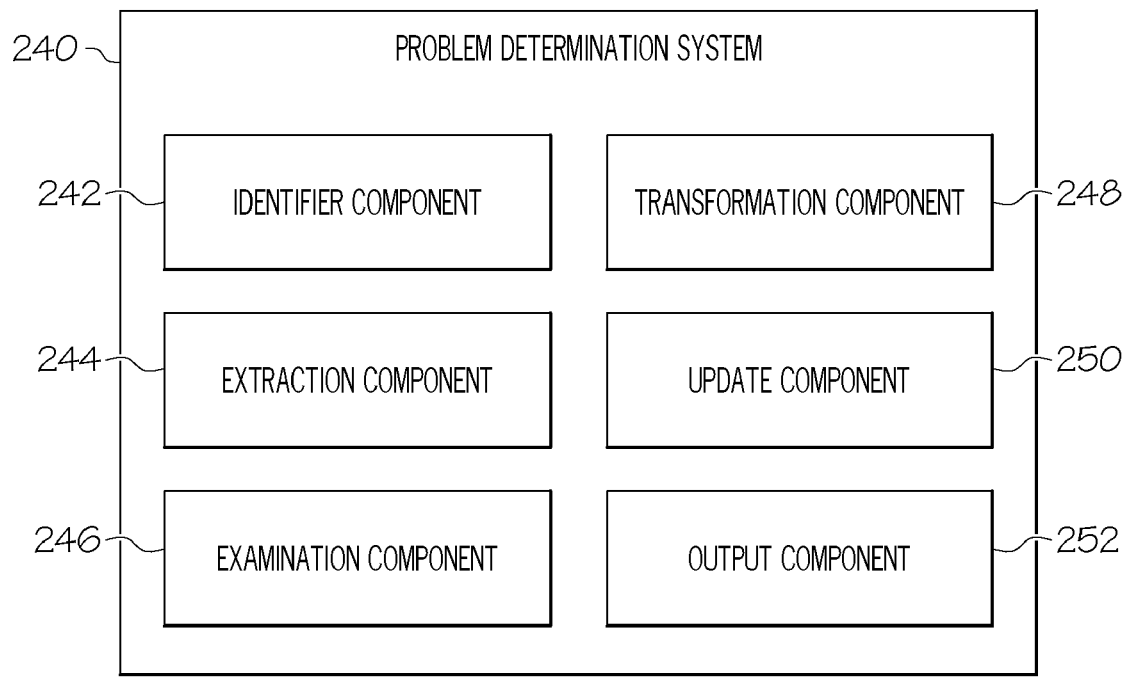
FIG. 5 is a block diagram of a problem determination system that provides problem determination knowledge according to various aspects of the present invention.

Referring to FIG. 5, a problem determination system may be provided according to various aspects of the present invention. The problem determination system 240 comprises an identifier component 242, an extraction component 244, an examination component 246, a transformation component 248, an update component 250 and an output component 252. The identifier component 242 is provided to identify at least one problem tracking tool that contains tags therein, where the tags relate to problem knowledge. The extraction component 244 is provided to extract information from the tags provided in the identified problem tracking tools(s), where the extracted information is related to problem description knowledge. The examination component 246 is provided to examine the information extracted from the tags and the transformation component 248 is provided to transform the information extracted from the tags into symptom data based upon the examination of the information. The update component 250 is provided to update a catalog of symptom definitions based upon the symptom data, wherein each symptom definition comprises data that characterizes a symptom to a previously considered problem. The output component 252 is provided to make at least a portion of the catalog of symptom definitions available to a software tool for performing at least one of problem determination and problem analysis.

In practice, the various components of the system 240 may be combined into various logical groupings of component functions. Moreover, the various components may be distributed across multiple processing devices.

Figure 6:
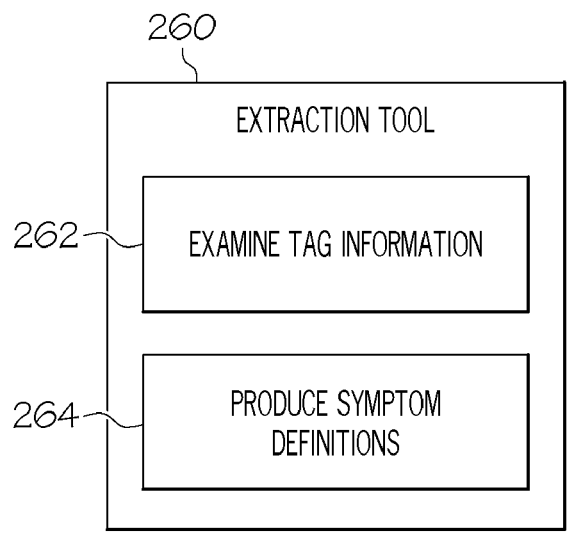
FIG. 6 is a block diagram of an extraction tool according to various aspects of the present invention.

Referring to FIG. 6, one or more of the components that comprise the problem determination system 240 shown in FIG. 5 may be implemented as an extraction tool 260. The extraction tool 260 may operate off-line or in real time, depending upon the particular implementation. The extraction tool 260 includes a component 262 that examines tag information and a component 264 that produces symptom definitions. For example, the component 262 may implement the functions of the identifier component 242 and the extraction component 244 of the problem determination system 240. The component 264 may implement the functions of the examination component 246, the transformation component 248, the update component 250 and the output component 252 of the problem determination system 240.

As noted more fully herein, according to various aspects of the present invention, a subject matter especialist records problem knowledge inside a corresponding problem tracking system that is ordinarily used for problem tracking and/or problem resolution, such as CMVC, RETAIN, ClearQuest, Bugzilla, etc., by supplying "tags". The method of providing problem determination knowledge 160 and/or the problem determination system 240 extracts these special tags and transforms knowledge recorded in these tags into symptom data. In this regard, the transformed symptom data may be utilized to create new symptom definitions. Alternatively, the symptom data may be utilized to update, maintain, etc., which may be collected in a symptom catalog.

The tag information may be extracted, for example, by running automated or semi-automated scripts that extract the problem knowledge from the problem tracking system(s). According to an aspect of the present invention, a command-line interface may be integrated into nightly build environment that automates the tasks of extracting, examining and/or transforming tag information into symptom data that is used to create and/or update symptom definitions. Scripts may indicate problems in the tags and require human intervention. As such, a fully automated system may alternatively be augmented by interaction with domain experts. Still further, domain experts may transform extracted tag information into symptom data that is used to create and/or update symptom definitions. Domain experts may comprise a human operator, e.g., an information technology support specialist, an analyst or developer. Domain experts may also comprise an automated system, including intelligent autonomous computing systems or combinations of human and automated processes.

The information in the tags may comprise regular text, such as may be recorded inside problem tracking remarks. For example, individual log entries may be used to characterize a problem. Where known, recommendations may also be recorded that identify or suggest solutions to the characterized problem. Moreover, the tag information may be provided in an unstructured format or in a structured format. Where the information is unstructured, intelligent automated processing or human domain experts may be utilized to transform the unstructured information into symptom data. Alternatively, the especialist can format the information in the tags using a format, such as a standardized symptom format that allows the information to be imported and directly applied to create and/or maintain symptom definitions. An exemplary format is described in greater detail herein. Different experts may have different views, knowledge and understanding. As such, different domain experts may determine that different symptoms are indicative of a given root cause problem. As such, the interaction of domain experts and the symptoms database may continually provide updated, modified and expanded information.

In order to allow the various subject matter especialists to support, maintain, manage and troubleshoot, a user associated with the entity in need of support may be required to provide or otherwise grant the corresponding specialist access to one or more event sources. A representative event source may comprise software, e.g., an application or event log, or hardware, such as an event logging device or adapter. The various event sources will, from time to time, generate problem determination events. The subject matter especialists may integrate snippets of event information, such as relevant problem determination events, into the tags. The especialist may also include other annotations and relevant information as may be deemed useful for problem determination. Each domain expert is likely to have unique knowledge that can be collected and organized in a manner that makes diverse amounts of problem determination knowledge accessible and understandable.

Figure 7:
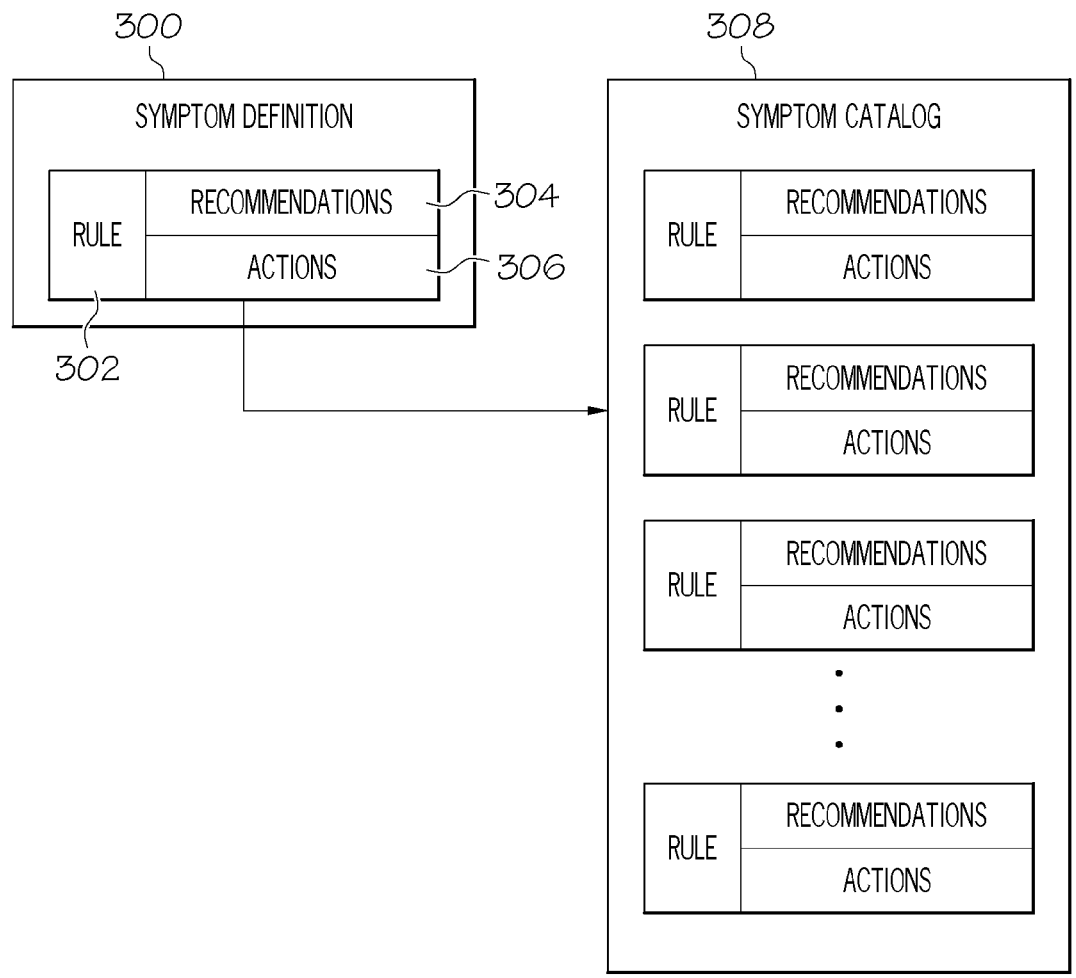
FIG. 7 is a block diagram illustrating symptom definitions and their association with a symptoms catalog.

Referring to FIG. 7, each symptom definition 300 characterizes a symptom, e.g., to a previously considered problem, and represents knowledge that is presented by a domain expert and/or is mined by an autonomic symptom miner. Each symptom definition may include for example, at least one event correlation rule 302. A symptom definition 300 may also include a recommendation 304, e.g., a suggestion to human users upon detection of the symptom. A symptom definition 300 may further include one or more actions 306, e.g., executed by a subject matter especialist, an end user, an autonomic manager, etc. upon detection of the symptom.

Each rule 302 may comprise a list of conditions that characterize the occurrence of the symptom. For example, each rule may have at least one predicate thereof that can be corresponded to event or other information, such as may be derived from log files, dumps, etc. For example, a domain expert, e.g., a support analyst may recognize that within the system, if error X occurs to component Y, then product Z may crash, fail, terminate, etc. However, the problem associated with product Z can be detected by recognizing that symptoms A, B and C are simultaneously present and correspond to the error X in component Y. As such, a solution can be identified, and/or a problem may be prevented, mitigated, compensated for or otherwise corrected if the problem and knowledge of a solution can be brought to the attention of an operator within an appropriate time. As such, the symptoms may not only describes problems but further may be used to encode rules and/or provide an action to achieve solutions that stem from or relate to the current "symptom" or pattern that corresponds with a root cause problem.

As a few illustrative examples, a first symptom definition may include a rule that states:

If log records contain a string "COM.ibm.db2.jdbc.app.DB2PreparedStatement.SQLBind Character"

The Recommendation may read "This problem happens when the WAS datasource . . . " "verify that the JDBC driver in WebSphere matches the version of the installed DB2 server . . . "

In this example, the Actions may not specify an action.

As another illustrative example, if a symptom definition contained a rule that states:

If log records contain a string "COM.ibm.db2.jdbc.app.DB2PreparedStatement.SQLBind Character"  and  a different log record contains the string "EJPPH0014E"

The Recommendation may read "Refer to technote http://www-1.ibm.com/support/docview.wss?rs=1045&context=SW610&xontext=SW620&context . . .

In this example, the Actions may not specify an action.

As another example, the symptom definition A may be predicated upon the occurrence of events D, E and F. As will be described in greater detail herein, the probability of the occurrence of symptom A may be predicted by identifying the occurrence of any one or more of the predicate events D, E and F. Accordingly, the occurrence of a problem associated with product Z can be predicted before symptom A fully materializes, e.g., by determining that one or more of the predicates has been satisfied. As such, a support person with little knowledge of the root cause of a problem may be able to accurately diagnose root causes to problems and determine effective solutions.

For example, a user may collect events from one or more event sources and correlate the collected events with symptoms. An event may be deemed to participate with a symptom, for example, if that event satisfies at least one predicate of an event correlation rule associated with the symptom. Thus, a correlation is satisfied even if a partial match to a correlation rule is satisfied. As another example, an attribute of the event may be matched at least partially with one or more or the extracted symptoms from the symptom definition catalog. Correspondingly, events or attributes of the events may be associated with corresponding types of symptoms. A prediction of the likelihood that select symptoms will occur may be performed, based at least upon current predicates of the event correlation rules of the select symptoms that are satisfied by the collected events.

The symptom definitions 300 may be organized into a symptom catalog 308, which thus represents a logical grouping of symptom definitions 300. The symptom definitions 300 may also be grouped by product catalogs, complemented by product assembly catalogs or organized in other ways. Accordingly, a whole taxonomy of symptom definitions leading to similar problems may be created. In this regard, it is often the case that the solutions to similar problems are often similar themselves.

According to one aspect of the present invention, the analysis of symptoms may be standardized and shared among domain experts who have obtained experience and/or expertise with regard to root cause problems by organizing the symptom catalog 308 in a standard knowledge format, such as a symptoms database.

According to further aspects of the present invention, the symptom catalog 308 need not comprise all of the symptom definitions 300. For example, certain symptom definitions may be deemed ready for usage in problem determination. These symptom definitions may be verified through system testing, etc., may be translated into multiple product languages and maybe under source control. For example, domain experts may have ensured that the log records mentioned in the symptom rule(s) characterize the problem. Domain experts may also have ensured that the recommendation(s) solve the corresponding problem. Still further, domain experts may have provided and/or ensured that ambiguous product messages are properly characterized by utilizing conditional, clarifying or other types of recommendations.

Alternatively, symptom definitions may be deemed not sufficiently defined to warrant use in problem determination efforts. In this regard, symptom data is still valuable in building the symptom definition. For example, especialists can encode speculative information or hints into tags. As an example, a hint such as "this log entry seems related to small JVM heap sizes" may be encoded in a tag. Such conditional/speculative or ill-defined tag features may not be formally verified and added to the symptom catalog for problem determination support, e.g., until further refinement of the symptom definition may be implemented. Moreover, there is no need to translate the symptom definition into multiple product languages until the symptom definition is complete. However, development, verification and/or other support engineers may have visibility to such incomplete problem determination knowledge so that the previously learned lessons may be considered by trained support persons, e.g., subject matter especialists. For example, development and verification can use annotated tags on CMVC comments. Moreover, CMVC scripts can be utilized to convert tags into symptom catalogs.

Figure 8:
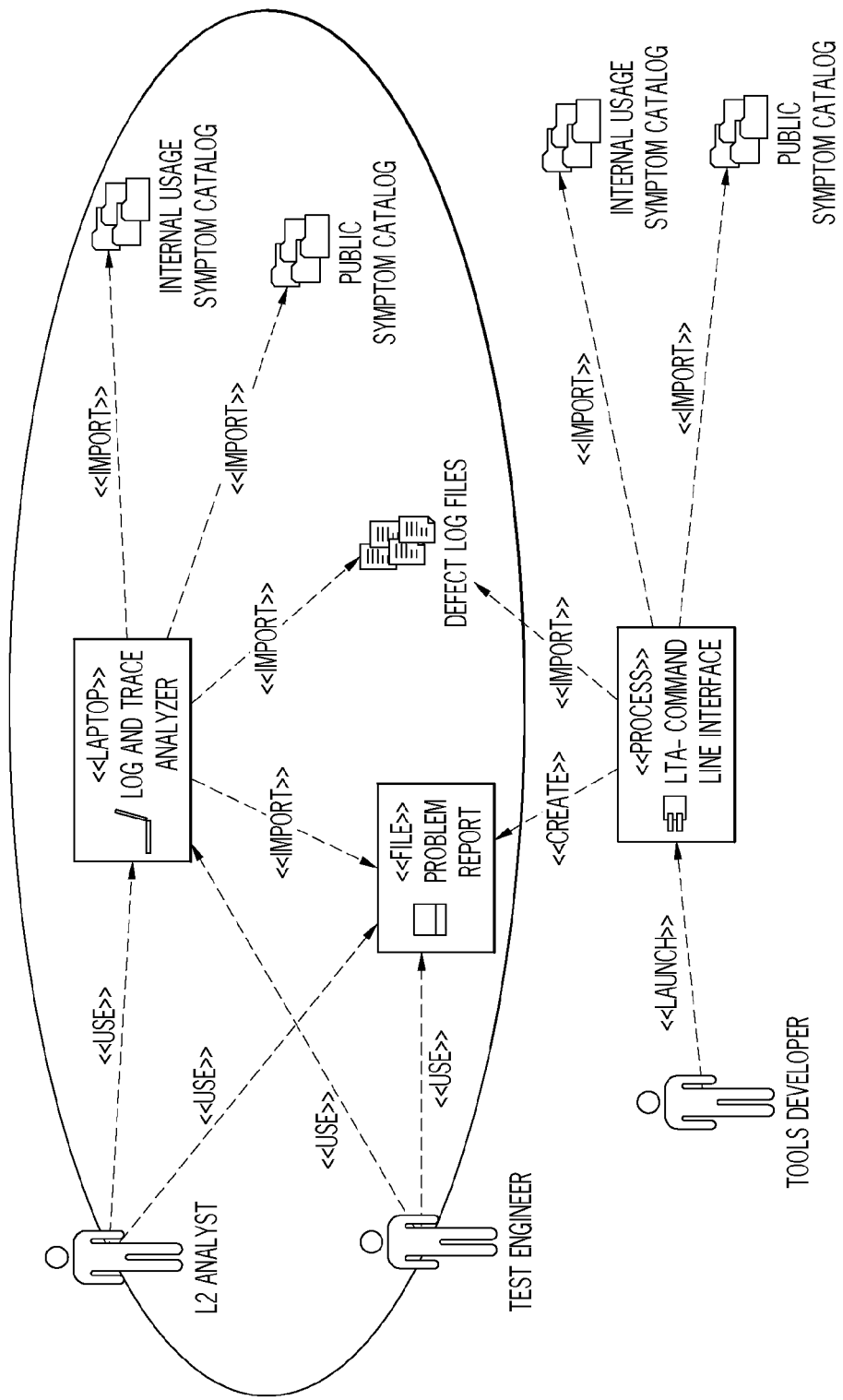
FIG. 8 is a flow diagram illustrating the collection of problem knowledge according to various aspects of the present invention.

As noted above, according to various aspects of the present invention, problem resolution knowledge may be reused, e.g., using log and trace analyzer tools. Referring to FIG. 8, an exemplary log and trace environment is shown. An L2 Analyst and a Test engineer both use a Log and Trace Analyzer and Problem Report tools for problem determination. The Log and Trace Analyzer imports information from one or more problem report files, from defect log files, from internal usage Symptom Catalog(s) and/or from Public Symptom Catalogs for problem determination.

Additionally, a tools developer may launch an extraction tool, e.g., via a log trace analyzer command line interface, which creates the problem report files utilized by the L2 analyst, the Test engineer and the Log and Trace Analyzer. The command line interface may also import defect logs, etc., as well as internal symptom catalog(s) and public symptom catalog(s). In this regard, the illustrated Log and Trace Analyzer, such as utilized by the Tools developer, may implement the method of providing problem determination knowledge 160 and/or the problem determination system 240 and/or the extraction tool 260 described in greater detail herein.

The above environment has been simplified for purposes of clarity of discussion herein and is provided by way of illustration and not by way of limitation as to the reuse of problem determination knowledge.

Figure 9:
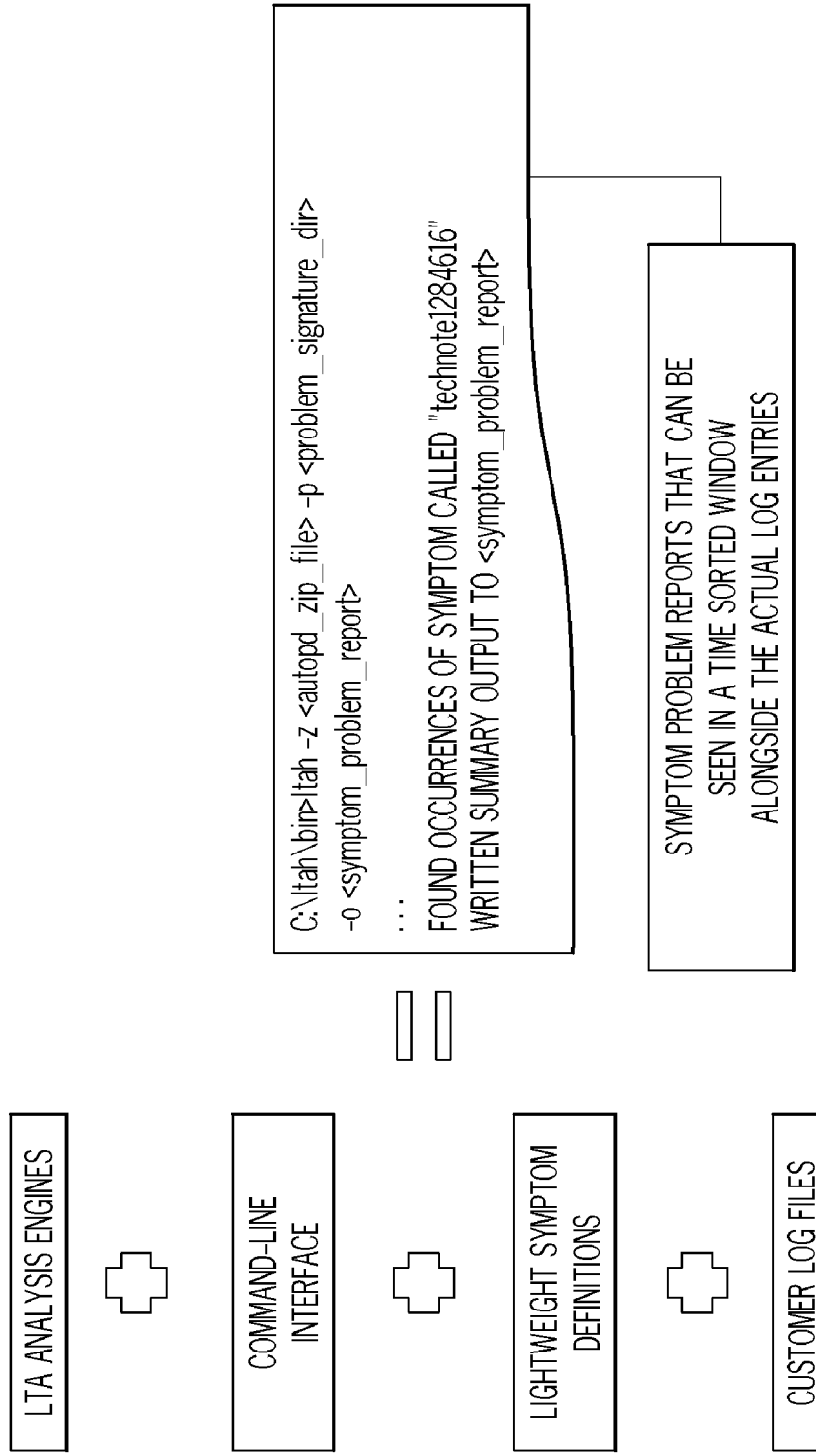
FIG. 9 is a block diagram illustrating the collection of problem knowledge according to various aspects of the present invention.

Referring to FIG. 9, the log trace analysis engines such as used by the Log and Trace Analyzer shown in FIG. 8, in combination with the command line interface Log and Trace Analyzer, also shown in FIG. 8, in further combination with lightweight symptom definitions and customer log files may be implemented according to aspects of the present invention, such as for debugging problems over telnet sessions before transferring customer files to a support specialist. For example, symptom problem reports may be seen in a time-sorted window alongside the actual log entries, an example of which is provided below:

---

C:\Itah\bin\Itah -Z <autopd_zip_file> -p <problem_signature_dir>
-o <symptom_problem_report>

...

Found occurrences of symptom called "technote 1284616"
Written summary output <symptom_problem_report>

---

Figure 10:
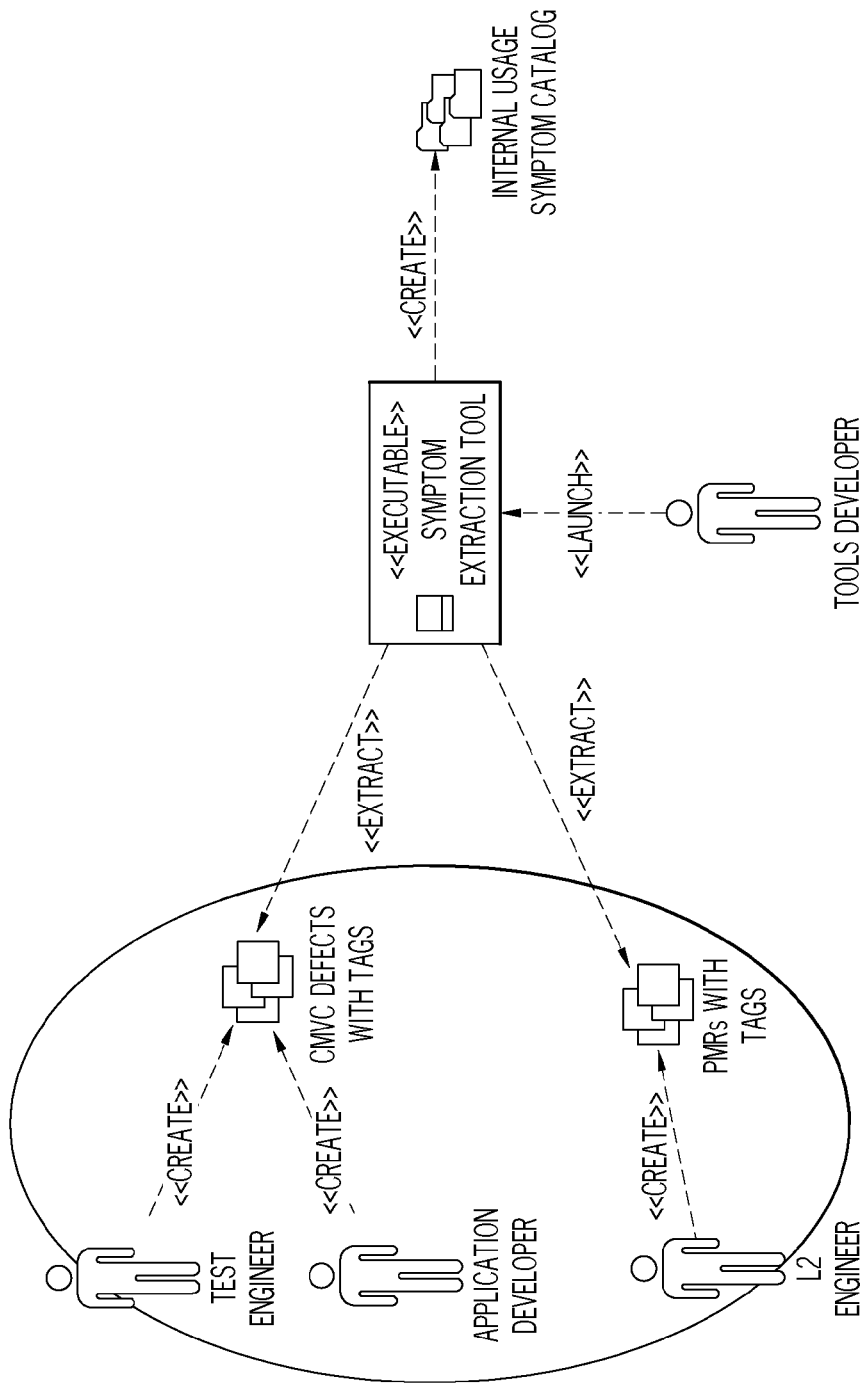
FIG. 10 is a flow diagram illustrating the collection of problem knowledge according to various aspects of the present invention.

With reference to FIG. 10, another exemplary environment illustrates knowledge collection through CMVC and PMR tagging. As shown, test engineer(s) and application developer(s) may create CMVC defect records with tags. As another example, L2 engineer(s) may create and/or revise PMRs with tags. A Tools developer launches an extraction tool, which is utilized to extract information from the CMVC defects with tags and/or the PMRs with tags. The extraction tool is used to create and/or update symptom definitions in an internal usage symptom catalog and/or public catalog, etc. In this regard, the illustrated extraction tool may implement the method of providing problem determination knowledge 160 and/or the problem determination system 240 and/or the extraction tool 260 described in greater detail herein.

Figure 11:
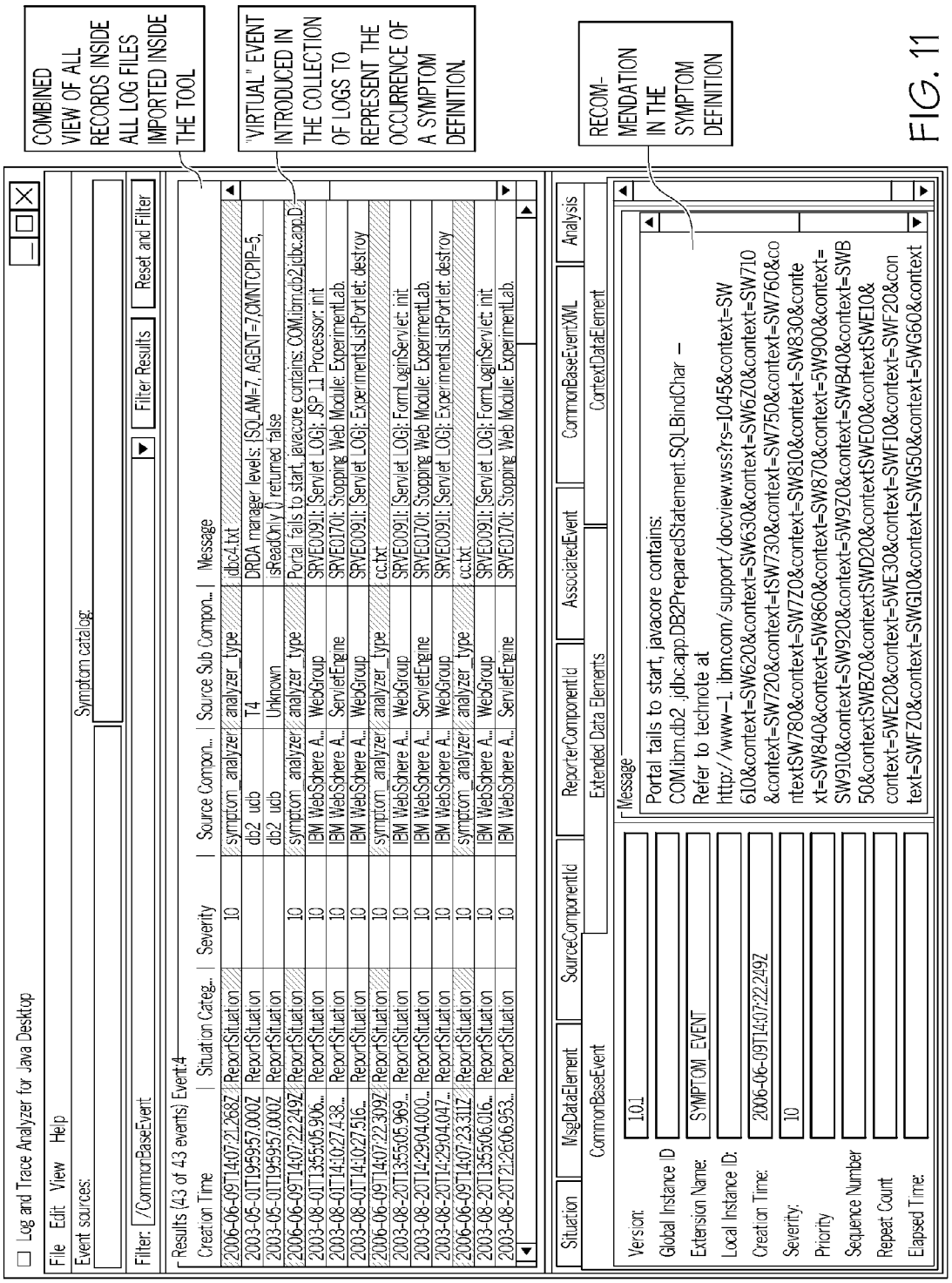
FIG. 11 is an exemplary screen shot of an exemplary problem determination analysis using symptom problem reports according to various aspects of the present invention.

Referring to FIG. 11, an exemplary screen shot illustrates problem analysis using symptom problem reports according to various aspects of the present invention. As shown, a combined view of all records inside all log files imported into the tool may be made available for inspection. Virtual events introduced in the collection of logs may be used to represent the occurrence of a symptom definition. Moreover, recommendation(s) in the symptom definition may be displayed.

The illustrated log and trace analyzer may be implemented as an application, as a plug-in, as a web-based application, as a Java based application, etc., offering different levels of functionality and capabilities for the targeted audience. Regardless of the particular platform or level of functionality that the software is provided, the log and trace analyzer provides viewing, merging sorting and filtering of event and symptom data. The log and trace analyzer may be further programmed to provide event correlation, single event and cross-event analysis of symptoms, remote and local data collection and event conversion, custom summary views and import and export features of filters, rules event source configuration data etc. The log and trace analyzer may be utilized for example, by software developers, solutions integrators, testers, systems operators, system analyst and/or support engineers.

In the illustrated screen shot, the software has been configured such that events are filtered for common base event (CBE) formatted events. The utilization of CBE formatted events may be desirable, for example, when utilizing autonomic management systems to implement various aspects of the present invention as the CBE events can define the structure of an event sent as the result of a situation in a consistent and common format. The CBE log data may further be provided in the extended markup language (XML).

The log and trace analyzer retrieves and analyzes CBE log data in conjunction with symptom definitions. The exchange between the log and trace analyzer application and the symptoms definitions may be performed, for example, using an XML path language such as Xpath, Active Correlation Technology (ACT) rule language, or other suitable technique. As a few illustrative examples, the log and trace analyzer may be utilized to create a triaged event wherein events are ordered based upon their current importance for deeper analysis and correlation, or for performing the correlation and analysis functions. The log and trace analyzer may correlate events on a timestamp and/or other CBE properties or attributes depending for example, upon operator preference and/or the particular type of analysis being performed.

In the example as illustrated, a customizable summary view of event and symptom data is provided, and the ability to select and expand any raw data from the summary view to display the full CBE attributes in window is further provided.

Figure 12:
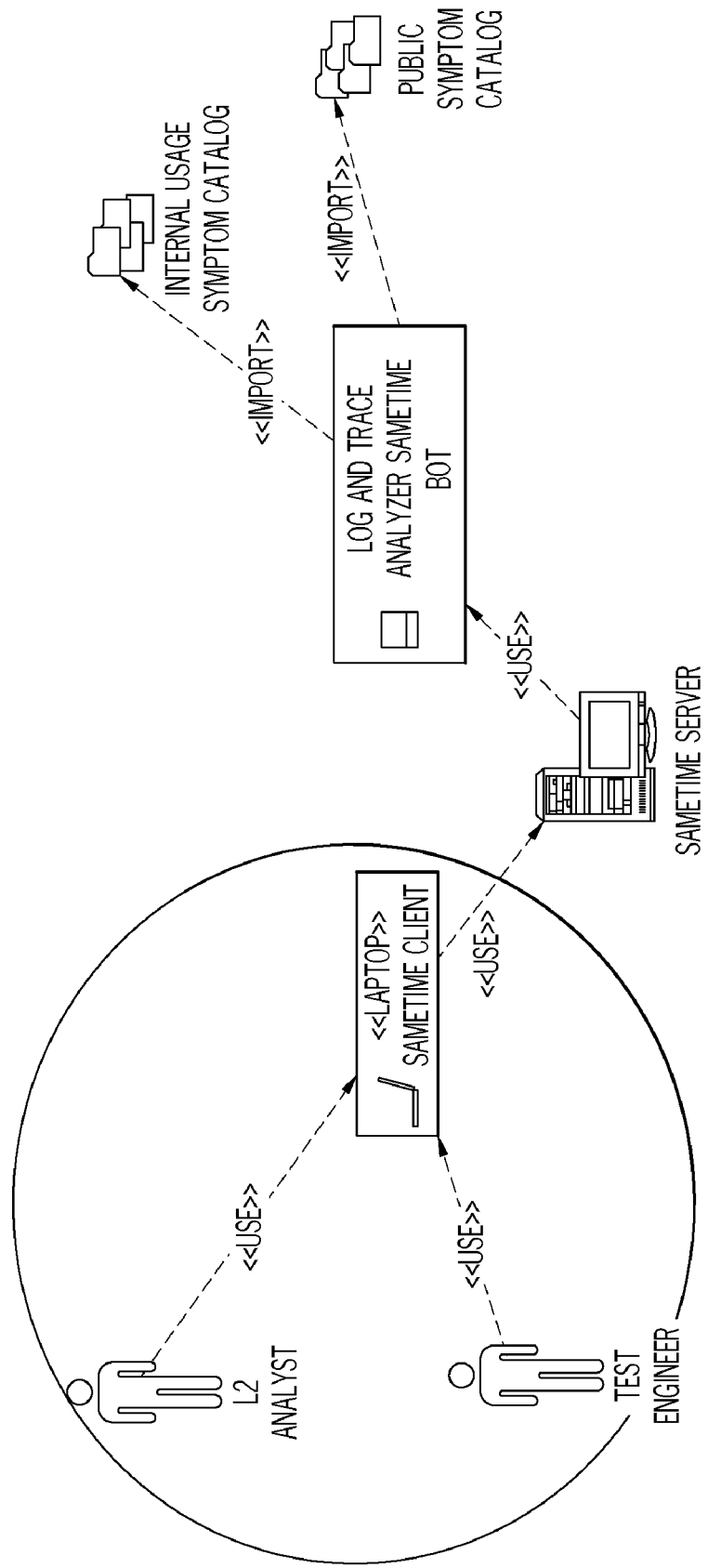
FIG. 12 is a flow diagram illustrating the collection of problem knowledge according to aspects of the present invention.

Referring to FIG. 12, another exemplary environment is illustrated. As shown, one or more L2 analysts and/or one or more test engineers may use a Sametime client that is logged into a Sametime server for providing problem determination and support. The Sametime server uses a log and trace analyzer that includes a Sametime bot and imports internal usage symptom catalog(s) and/or public symptom catalog(s).

Figure 13:
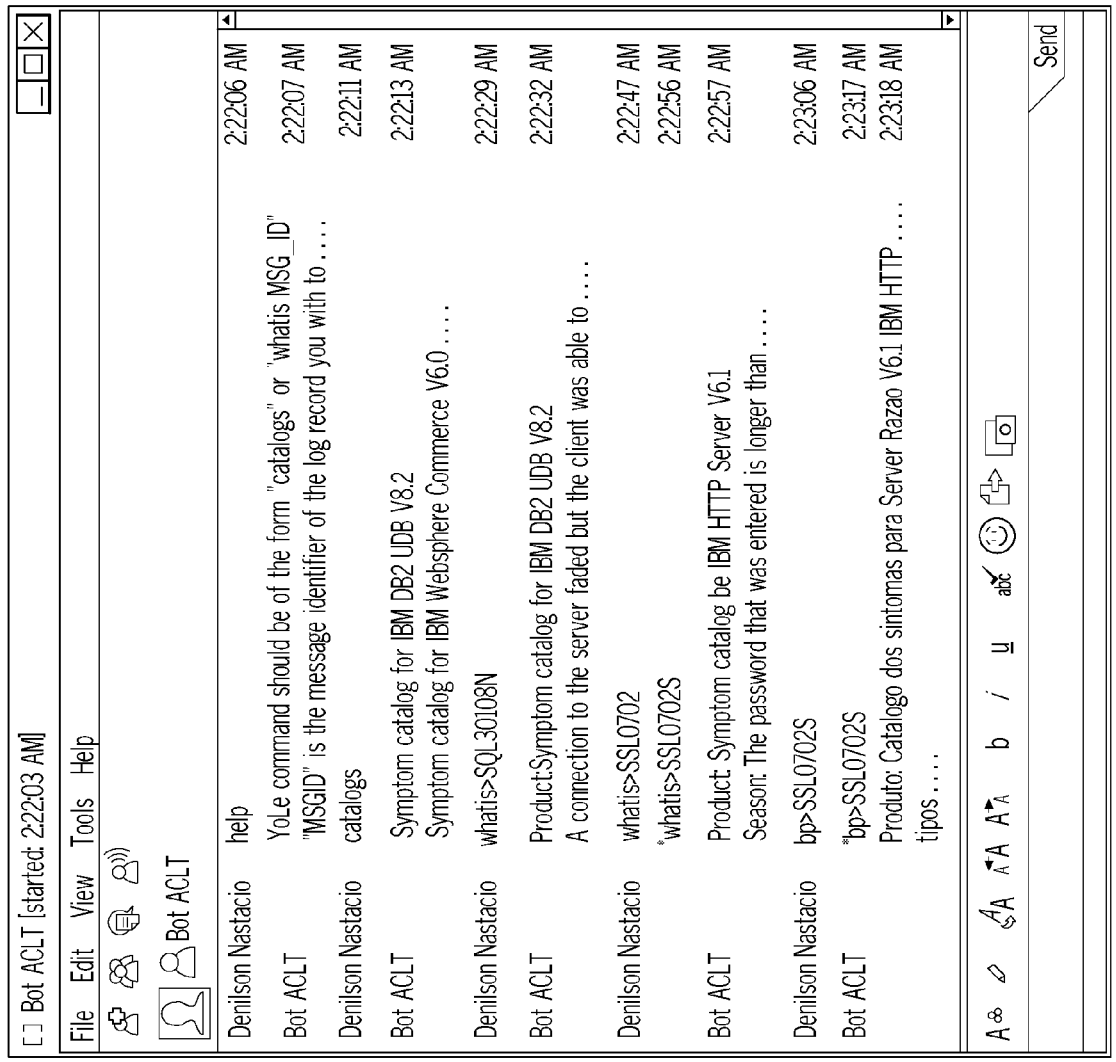
FIG. 13 is a block diagram illustrating the collection of problem knowledge according to various aspects of the present invention.

Referring to FIG. 13. The log trace analysis engines may be utilized in combination with autonomic computing symptom catalogs, a WebSphere translation server and Sametime Client components as shown in an illustrative and exemplary screen shot.

According to an aspect of the present invention, accuracy is combined or blended with effort to implement a problem tracking solution. For example, an initial target may comprise quickly producing a large number of hints and recommendations. Once the symptom definitions have matured into verified data, customer catalogs may be provided.

Referring to FIGS. 14A and 14B, an exemplary syntax for symptom data generation is illustrated. A subject matter especialist may enter data directly into tags using the syntax. Alternatively, an automated process may be utilized to convert unstructured text into the syntax to derive symptom data which may be used to create and update symptom definitions.

The various aspects of the present invention may be used for tagging defects related to code problems during development. Additionally, tagging may be used for configuration problems, such as may be diagnosed by test and support engineers.

As an example, the extraction tool 260 (or the problem determination system 240 or method 160) may extract tags in a CMVC system by scanning all defects in a track or level and process ".symptom" tags. The extraction tool 260 may write a symptom catalog file for the track or level. In this regard, a tool may be utilized to merge the individual symptom catalog files into an all symptoms file. Also, an error may be triggered, e.g., if a missing symptom description is detected or if a symptom recommendation does not comply with formatting rules, and appropriate action may be taken. Further, warnings may be given during an automated examination of the tags, such as where a symptom recommendation is missing, or where a defect abstract is used as a symptom title.

As another example, the extraction tool 260 (or the problem determination system 240 or method 160) may extract tags in a RETAIN system by scanning all PMRs within a predefined time period, e.g., a week, since last scan, etc. and by processing all identified "symptom" tags. A symptom catalog may be augmented with new symptom definitions and edits/modifications to existing symptom definitions. As per the previous example, a tool may be utilized to merge the individual symptom catalog files into an all symptoms file. Also, an error may be triggered, e.g., if a missing symptom description is detected or if a symptom recommendation does not comply with formatting rules, and appropriate action may be taken. Further, warnings may be given during an automated examination of the tags, such as where a symptom recommendation is missing, or where a defect abstract is used as a symptom title.

As noted in greater detail above, subject matter especialist record snippets of trace/log entries within problem tracking tools. For example, subject matter especialists may record the snippets during their involvement in the problem resolution process. An extraction tool is then utilized to examine the tags added to each problem to create a series of symptom definitions that can guide an end user on the data collection and event solution to the problem.

An example illustration of a tag is provided below:

---

PMR Comments for PMR XYZ

---

---pmr opened by customer #1 ---
    text text text text text text text
    text text text
    text text text text
---comment added by WAS SME ---
    text text text text text text text
    symptom.log="com.ibm.db2.ConnectionException: ...
    symptom.log=SRV0987E Server startup has failed...
    symptom.recommendation=Missing WAS trace, if "trace.log" not available, turn on the WAS JDBC trace be executing "these steps" and collect the file "trace.log".
    text text text
    text text text text
---<customer #1 sends the "trace.log" file to SME>---
---WAS SME does not recognize the entries in the file and reassigns the problem to the DB2 SME ---
---comment added by DB2 SME ---
    text text text comment text comment text comment
    symptom.log="sqlstate=871243"
    symptom.log="sqlstate=871276"
    symptom.recommendation=It may be that FP5 is not installed, request customer to submit DB2 log called "diag.log"
---<customer #1 responds, e.g., calls back, several days later with the file>---
---comment added by DB2 SME ---
    text text text comment text comment text comment
    symptom.log="DB25676I DB2 8.2 with FP 5"
    symptom.recommendation=Install FP 6 as per technote http://www.ibm.com/...
---< customer #1 responds, e.g., calls back, to report the solution worked and needs instruction on how to turn off trace>---
---comment added by DB2 SME ---
    symptom.recommendation=Turn off DB2 trace by running -continued PMR Comments for PMR XYZ these steps...
---pmr assigned to WAS SME ---
---comment added by WAS SME---
    symptom.recommendation=Turn off WAS trace by running these steps...
---pmr closed to WAS SME---

The extraction tool produces the following problem signatures based upon the time difference between the recommendations.

Signature 1
symptom.log="com.ibm.db2.ConnectException: . . .
symptom.log=SRV0987E Server startup has failed. . .
symptom.recommendation=Missing WAS trace, if "trace.log" not
available, turn on the WAS JDBC trace be executing "these steps" and
collect the file "trace.log".
Signature 2
symptom.log="com.ibm.db2.ConnectException: . . .
symptom.log=SRV0987E Server startup has failed. . .
symptom.log="sqlstate=871243"
symptom.log="sqlstate=871276"
symptom.recommendation=It may be that FP5 is not installed, request
customer to submit DB2 log called "diag.log"
Signature 3
symptom.log="com.ibm.d2.ConnectException: . . .
symptom.log=SRV0987E Server startup has failed. . .
symptom.log="sqlstate=871243"
symptom.log="sqlstate=871276"
symptom.log="DB256761 DB2 8.2 with FP5"
symptom.recommendation=Install FP6 as per technote http://www.ibm.com/ . . .
Signature 4
symptom.log="com.ibm.db2.ConnectException: . . .
symptom.log=SRV0987E Server startup has failed.
symptom.log="sqlstate=871243"
symptom.log="sqlstate=871276"
symptom.log="DB256761 DB2 8.2 with FP5"
symptom.recommendation=Install FP6 as per technote http://www.ibm.com/. . .
symptom.recommendation=Turn off DB2 trace by running these steps . . .
Signature 5
symptom.log="com.ibm.db2.ConnectException:
symptom.log=SRV0987E Server startup has failed.
symptom.log="sqlstate=871243"
symptom.log="sqlstate=871276"
symptom.log="DB256761 DB2 8.2 with FP5"
symptom.recommendation=Install FP6 as per technote http://www.ibm.com/ . . .
symptom.recommendation=Turn off DB2 trace by running these steps.
symptom.recommendation=Turn off WAS trace by running
these steps . . .

In the above example, the knowledge may sometimes be imprecise. However, even the imprecise data may provide a good indication as to how to solve a problem.

As another example, CMVC is utilized as the problem determination tool and an obvious bug is discovered as a code defect. Assume that the defect is observed. A tester opens a defect and reports the observed symptoms, e.g. " . . . log in panel returns 'Cannot logon' message . . . ∓

CMVC Comments for Defect XYZ
  - - - defect opened by SVT person #1 - - -
Text text text text text text text
Text text text
Text text text text A chief Programmer may then look in the "SystemOut.log" file and find a message that confirms a problem in the sign on module.

- - - comment added by Chief Programmer - - -
Text text text text text text text
Text text text
.symptom.log=SystemOut.log|WLC0087E Failed to start sign on module . . . "

A security developer may then look into "System.err" and find a Java stack trace indicating a bug in the sign on code. The problem is fixed and closed.

- - - defect assigned to Security Developer - - -
  - - - comment added by Security Developer - - -
Text text text comment text comment text comment
.symptom.log={SystemErr.log ! java.lang.IndexOutOfBoundsException, com.ibm.module.SignOn.processRequest}
.symptom.recommendation=fixed
  - - - defect integrated and closed - - -

The special value "fixed" above, indicates that the problem should no longer occur. The actual symptom definition generated by the CMVC script contains a reference to the defect.

As another example, CMVC is utilized as the problem determination tool and missing code is discovered as a code defect. Assume that a defect is observed. For example, a tester may open a defect and report the observed symptoms, e.g. " . . . log in panel returns 'Cannot logon' message . . . "

CMVC Comments for Defect XYZ
  - - - defect opened by SVT person #1 - - -
Text text text text text text text
Text text text
Text text text text A Chief Programmer may immediately reassign the problem to the developer for the security module.

- - - comment added by Chief Programmer - - -
Text text text text text text text
Text text text
  - - - defect assigned to Security Developer - - -
  - - - comment added by Security Developer - - -
Text text text comment text comment text comment
.symptom.log.missing=SystemOut.log ! WLC00871 Sign On Application has started . . . "

The Security Developer may not find any entries that indicate that the sign on module has started.

- - - comment added by Security Developer a day later - - -
Text text text comment text comment text Text text text comment text comment text comment Text text text comment text comment text comment comment
.symptom.recommendation=fixed
  - - - defect integrated and closed - - -

This example shows a build script problem where the security module simply had not been added to the WAR file containing the entire web application.

As yet another example, CMVC is utilized as the problem determination tool and a configuration error is discovered. Assume that a defect is observed. A tester may open a defect and report the observed symptoms, e.g. "After changing database configuration . . . log in panel returns 'Cannot logon' message . . . "

CMVC Comments for Defect XYZ p - - - defect opened by SVT person #1 - - -
Text text text text text text text
Text text text
Text text text text A Chief Programmer may investigate the problem and find, for example, one log record in "trace.log" at 10:34:50 AM and another in "SystemOut.log" at 10:32:56 AM. Under these circumstances, a database developer seems like the most appropriate domain expert to continue investigating the defect.
- - - comment added by Chief Programmer - - -
Text text text text text text text
.symptom.log=SystemOutulog ! "com.ibm.db2.Connect Exception:
.symptom.log=SystemOut.log ! SRV0987E Server startup has failed.
Text text text
Text text text text
- - - defect assigned to DB Developer - - -

A database developer analyzes the rest of WAS configuration and may find, for example, a mismatch between the backend for an entity bean and the J2EE Data Source for the application containing the entity bean. For this example, assume that it is too late in the schedule for modifications in the installation module, thus the problem will have to be addressed in the release notes.
- - - comment added by DB Developer - - -
Text text text comment text comment text comment
.symptom.log="dbtrace.trc ! DBC98651 Cloudscape 5.1 JDBC driver loaded" . . .
.symptom.description=The process was configured to use Cloudscape as the RDBMS provider but the WAS data source . . .
.symptom.name=Data source configuration mismatch
(Defaults to defect abstract)
- - - defect assigned to ID person - - -
.symptom.recommendation=Read section Y from release notes . . .

As yet another example, CMVC is utilized as the problem determination tool and an error caused by using wrong tags is discovered. Assume that a defect is observed. A tester may open a defect and report the observed symptoms, e.g. "After changing database configuration . . . log in panel returns 'Cannot logon' message . . . "
CMVC Comments for Defect XYZ
- - - defect opened by SVT person #1 - - -
Text text text text text text text
Text text text
Text text text text A Chief Programmer may investigate the problem and, for example, find one log record in "trace.log" at 10:34:50 AM and another in "SystemOut.log" at 10:32:56 AM. Under these circumstances, a database developer seems like the most appropriate domain expert to continue investigating the defect.
- - - comment added by Chief Programmer - - -
Text text text text text text text
symptom.log=SystemErr.trc ! "com.ibm.db2.Connect Exception:
.symptom.log=SystemOut.log ! SRV0987E Server startup has failed.
Text text text
Text text text text
- - - defect assigned to DB Developer - - -

A database developer may analyze the rest of WAS configuration and, for example, find that the message written by the chief programmer are related to a different problem, but these two other messages are the real cause for the problem.
- - - comment added by DB Developer - - -
Text text text comment text comment text comment
.symptom.reset
.symptom.log=dbtrace.trc ! DBC98651 Cloudscape 5.1 JDBC driver loaded" . . .
.symptom.description=The process was configured to use Cloudscape as the RDBMS provider but the WAS data source . . .
- - - defect assigned to ID person - - -
.symptom.recommendation=Read section Y from release notes . . .

As yet another example, RETAIN is utilized as the problem determination tool and an error caused by a missing or non-installed component is discovered. Assume that a problem is observed. For example, a customer may open a defect and report the observed symptoms, e.g. " . . . events not showing on event query . . . "
Comments for PMR XYZ
- - - defect opened by IBM L1 - - -
Text text text text text text text
Text text text
Text text text text An L2 analyst, who may work with a support engineer, may find, for example, that a problem may be caused by the Common Event Infrastructure component in WebSphere 6.1.
- - - comment added by IBM WebSphere L2 - - -
Text text text text text text
Text text text
- - - defect assigned to support center- - -

An expert on CEI may further note that there is no event listener installed in the environment.
- - - comment added by support engineer #1 - - -
Text text text comment text comment text comment
.symptom.log.missing=SystemOut.log ! CEM0076I The Common Event Infrastructure Message Listener has started."
- - - comment added by support engineer #2 - - -
Text text text comment text comment text Text text text comment text comment text comment Text text text comment text comment text comment comment
.symptom.explanation=See technote at http: . . .
.symptom.recommendation=See technote at http: . . .
- - - technote authored and PMR closed- - -

A second support engineer #2 may author a technote for example, and may add tags to PMR comments as to how the problem can be fixed.

As yet another example, RETAIN is utilized as the problem determination tool and an error caused by the queue depth not being set correctly is discovered. Assume that a problem is observed. For example, a customer may open a defect and reports the observed symptoms, e.g. " . . . events not showing on event query . . . "
Comments for PMR XYZ
- - - defect opened by IBM L1 - - -
Text text text text text text text
Text text text
Text text text text An L2 analyst, who may work with a support engineer, may find, for example, that a problem may be caused by the Common Event Infrastructure component in WebSphere 6.1.
- - - comment added by IBM WebSphere L2 - - -
Text text text text text text text
Text text text
- - - defect assigned to support center- - -

An expert on CEI may note, for example, that there are errors in the log file for the application sending the events.

- - - comment added by support engineer #1 - - -
Text text text comment text comment text comment .symptom.log=SystemOut.log ! CEA0987E Event emitter failed to send an event . . . "
- - - comment added by support engineer #2 - - -
Text text text comment text comment text Text text text comment text comment text comment Text text text comment text comment text comment comment .symptom.log=mqdump.log ! Error code 8059, queue is full . . . .symptom.explanation=See technote at http: . . . .symptom.recommendation=See technote at http: . . .
- - - technote authored and PMR closed- - -

An expert on MQ Series may find, for example, sporadic error messages about a queue being full, which is later confirmed to be the cause of the problems with the event senders.

Figure 15:
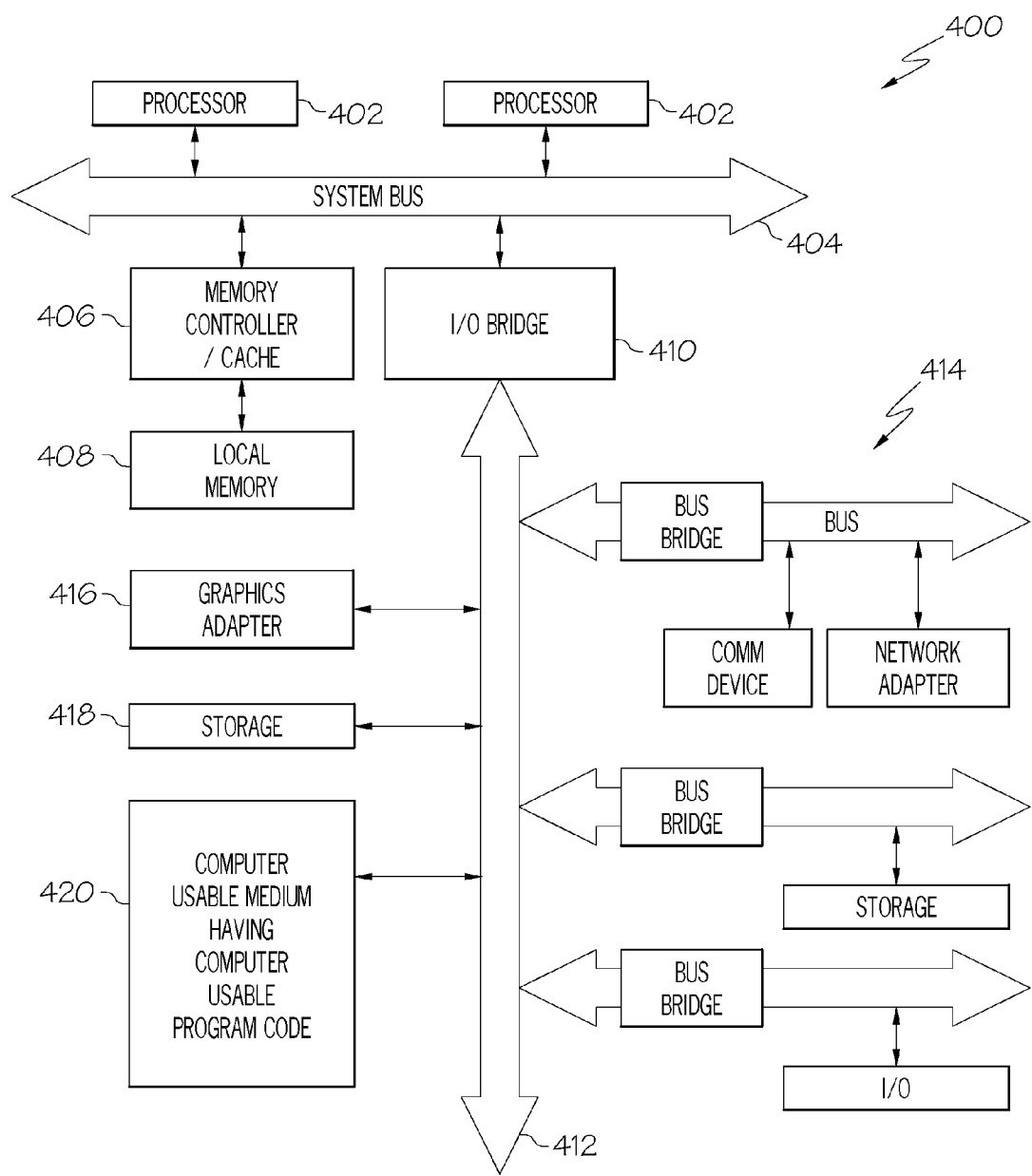
FIG. 15 is a block diagram of an exemplary computer system including a computer usable medium having computer usable program code embodied therewith, where the exemplary computer system is capable of executing a computer program product to provide problem determination knowledge according to various aspects of the present invention.

Referring to FIG. 15, a block diagram of a data processing system is depicted in accordance with the present invention. Data processing system 400 may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bus bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc.

Also connected to the I/O bus may be devices such as a graphics adapter 416, storage 418 and a computer usable medium 420 having computer usable program code embodied thereon. The computer usable program code may be utilized, for example, to implement the method 160 of FIG. 3, the problem determination system of FIG. 5, the extraction tool of FIG. 6 and/or any other various aspects of the present invention. The data processing system depicted in FIG. 15 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

A data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The processing devices may comprise for example, servers, personal computers, notebook computers, transactional systems, appliance or pervasive computing devices such as personal data assistants (PDA), palm computers, cellular access processing devices, special purpose computing devices and/or other devices capable of interacting with the system, and may thus be implemented in hardware, software, or a combination of hardware and software.

The various processing devices may be supported by networking components such as routers, hubs, firewalls, network interfaces, wired or wireless communications links and corresponding interconnections. Moreover, the network system may comprise one or more intranets, extranets, local area networks (LAN), wide area networks (WAN), wireless networks (WIFI), the Internet, including the World Wide Web, and/or other arrangements for enabling communication between the processing devices 102, either real time or otherwise, e.g., via time shifting, batch processing, etc.

Those of ordinary skill in the art will appreciate that the hardware in FIG. 15 may vary, depending on the implementation. For example, the above described components may be integrated or implemented as separate components. The depicted example is not meant to imply architectural limitations with respect to the present invention. Moreover, the above configuration is shown by way of illustration and not by way of limitation. As such, other processing system configurations may be implemented.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of providing problem determination knowledge comprising:
   identifying at least one problem tracking tool that contains tags therein, where said tags relate to problem knowledge;

extracting information from said tags that is related to problem description knowledge;

examining said information extracted from said tags;

transforming said information extracted from said tags into symptom data based upon said examination of said information;

updating a catalog of symptom definitions based upon said symptom data, wherein each symptom definition comprises data that characterizes a symptom to a previously considered problem; and making at least a portion of said catalog of symptom definitions available to a software tool for performing at least one of problem determination and problem analysis.

2. The method according to claim 1, wherein said extracting information from said tags that is related to problem description knowledge comprises:

reading remarks provided in discussion threads of said problem tracking tools to extract said information.

3. The method according to claim 1, wherein said updating a catalog of symptom definitions based upon said symptom data, wherein each symptom definition comprises data that characterizes a symptom to a previously considered problem comprises:

maintaining said catalog of symptom definitions, wherein each symptom definition comprises at least one rule that characterizes the occurrence of a corresponding symptom.

4. The method according to claim 1, wherein said examining said information extracted from said tags and transforming said information extracted from said tags into symptom data based upon said examination of said information comprises:

examining and transforming said information off-line after said information has been extracted from said tags.

5. The method according to claim 1, wherein said making at least a portion of said catalog of symptom definitions available to a software tool for performing at least one of problem determination and problem analysis comprises:

making said at least a portion of said catalog of symptom definitions available to a software tool comprising a problem submission tool that is integrated with said symptom catalog, wherein said portion of said catalog of symptom information is provided to guide a user towards executing additional data capture steps that would otherwise had been executed in the course of problem determination.

6. The method according to claim 1, wherein said making at least a portion of said catalog of symptom definitions available to a software tool for performing at least one of problem determination and problem analysis comprises:

making said at least a portion of said catalog of symptom definitions available to a software tool comprising an analyzer tool that is not integrated with said symptom catalog, wherein said portion of said catalog of symptom information is provided to guide a user towards a problem resolution.

7. The method according to claim 1, wherein said making at least a portion of said catalog of symptom definitions available to a software tool for performing at least one of problem determination and problem analysis comprises:

making said at least a portion of said catalog of symptom definitions available with knowledge such that a user can perform at least one of a guided data collection activity and a implementing a solution to a corresponding activity.

8. A computer program product to provide problem determination knowledge comprising:

a computer readable storage medium having computer usable program code embodied therewith, the computer usable program code comprising:

computer usable program code configured to identify at least one problem tracking tool that contains tags therein, where said tags relate to problem knowledge;

computer usable program code configured to extract information from said tags that is related to problem description knowledge;

computer usable program code configured to examine said information extracted from said tags;

computer usable program code configured to transform said information extracted from said tags into symptom data based upon said examination of said information;

computer usable program code configured to update a catalog of symptom definitions based upon said symptom data, wherein each symptom definition comprises data that characterizes a symptom to a previously considered problem; and computer usable program code configured to make at least a portion of said catalog of symptom definitions available to a software tool for performing at least one of problem determination and problem analysis.

9. The computer program product according to claim 8, wherein said computer usable program code configured to extract information from said tags that is related to problem description knowledge comprises:

computer usable program code configured to read remarks provided in discussion threads of said problem tracking tools to extract said information.

10. The computer program product according to claim 8, wherein said computer usable program code configured to update a catalog of symptom definitions based upon said symptom data, wherein each symptom definition comprises data that characterizes a symptom to a previously considered problem comprises:

computer usable program code configured to maintain said catalog of symptom definitions, wherein each symptom definition comprises at least one rule that characterizes the occurrence of a corresponding symptom.

11. The computer program product according to claim 8, wherein said computer usable program code configured to examine said information extracted from said tags and transforming said information extracted from said tags into symptom data based upon said examination of said information comprises:

computer usable program code configured to examine and transform said information off-line after said information has been extracted from said tags.

12. The computer program product according to claim 8, wherein said computer usable program code configured to make at least a portion of said catalog of symptom definitions available to a software tool for performing at least one of problem determination and problem analysis comprises:

computer usable program code configured to make said at least a portion of said catalog of symptom definitions available to a software tool comprising a problem submission tool that is integrated with said symptom catalog, wherein said portion of said catalog of symptom information is provided to guide a user towards executing additional data capture steps that would otherwise had been executed in the course of problem determination.

13. The computer program product according to claim 8, wherein said computer usable program code configured to make at least a portion of said catalog of symptom definitions available to a software tool for performing at least one of problem determination and problem analysis comprises:

computer usable program code configured to make said at least a portion of said catalog of symptom definitions available to a software tool comprising an analyzer tool that is not integrated with said symptom catalog, wherein said portion of said catalog of symptom information is provided to guide a user towards a problem resolution.

14. The computer program product according to claim 8, wherein said computer usable program code configured to make at least a portion of said catalog of symptom definitions available to a software tool for performing at least one of problem determination and problem analysis comprises:

computer usable program code configured to make said at least a portion of said catalog of symptom definitions available with knowledge such that a user can perform at least one of a guided data collection activity and implementation of a solution to a corresponding activity.

15. A system to provide problem determination knowledge comprising:

a identifier component to identify at least one problem tracking tool that contains tags therein, where said tags relate to problem knowledge;

an extraction component to extract information from said tags that is related to problem description knowledge;

an examination component to examine said information extracted from said tags;

a transformation component to transform said information extracted from said tags into symptom data based upon said examination of said information;

an update component to update a catalog of symptom definitions based upon said symptom data, wherein each symptom definition comprises data that characterizes a symptom to a previously considered problem; and an output component to make at least a portion of said catalog of symptom definitions available to a software tool for performing at least one of problem determination and problem analysis.

16. The system according to claim 15, wherein said extraction component reads remarks provided in discussion threads of said problem tracking tools to extract said information.

17. The system according to claim 15, wherein said update component maintains said catalog of symptom definitions, wherein each symptom definition comprises at least one rule that characterizes the occurrence of a corresponding symptom.

18. The system according to claim 15, wherein said examination and transformation components process said information off-line after said information has been extracted from said tags.

19. The system according to claim 15, wherein said output component makes said at least a portion of said catalog of symptom definitions available to a software tool comprising a problem submission tool that is integrated with said symptom catalog, wherein said portion of said catalog of symptom information is provided to guide a user towards executing additional data capture steps that would otherwise had been executed in the course of problem determination.

20. The system according to claim 15, wherein said output component makes said at least a portion of said catalog of symptom definitions available to a software tool comprising an analyzer tool that is not integrated with said symptom catalog, wherein said portion of said catalog of symptom information is provided to guide a user towards a problem resolution.

21. The system according to claim 15, wherein said output component makes said at least a portion of said catalog of symptom definitions available with knowledge such that a user can perform at least one of a guided data collection activity and implementation of a solution to a corresponding activity.

* * * * *